United States Patent
Takahashi

(10) Patent No.: US 9,090,802 B2
(45) Date of Patent: Jul. 28, 2015

(54) POLARIZING PLATE, IMAGE DISPLAY APPARATUS INCLUDING THE SAME, AND ADHESIVE COMPOSITION

(75) Inventor: Keita Takahashi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 268 days.

(21) Appl. No.: 13/600,030

(22) Filed: Aug. 30, 2012

(65) Prior Publication Data

US 2013/0050825 A1 Feb. 28, 2013

(30) Foreign Application Priority Data

Aug. 31, 2011 (JP) ................. 2011-188525

(51) Int. Cl.
| | | |
|---|---|---|
| G02B 5/30 | (2006.01) |
| C09J 103/02 | (2006.01) |
| C09J 105/16 | (2006.01) |
| C09J 139/06 | (2006.01) |
| C09J 139/08 | (2006.01) |
| C08G 18/64 | (2006.01) |
| C08G 18/79 | (2006.01) |
| C08G 18/28 | (2006.01) |
| C09J 175/04 | (2006.01) |

(Continued)

(52) U.S. Cl.
CPC ............ *C09J 103/02* (2013.01); *C08G 18/283* (2013.01); *C08G 18/6484* (2013.01); *C08G 18/792* (2013.01); *C09J 105/16* (2013.01); *C09J 139/06* (2013.01); *C09J 139/08* (2013.01); *C09J 175/04* (2013.01); *G02B 5/3016* (2013.01); *C08K 5/29* (2013.01); *C08L 5/16* (2013.01); *C08L 39/04* (2013.01)

(58) Field of Classification Search
CPC ...... C09J 103/02; C09J 105/16; C09J 139/06; C09J 139/08; C09J 175/04; C08G 18/6484; C08G 18/792; C08G 18/283; C08L 39/04; C08L 5/16; C08K 5/29; G02B 5/3016
USPC ................................... 359/487.02
See application file for complete search history.

(56) References Cited

U.S. PATENT DOCUMENTS

| | | | |
|---|---|---|---|
| 4,134,809 A | * | 1/1979 | Pacifici et al. .................. 522/14 |
| 6,417,261 B1 | | 7/2002 | Maier et al. |

(Continued)

FOREIGN PATENT DOCUMENTS

| | | |
|---|---|---|
| JP | 2002-507655 A | 3/2002 |
| JP | 4306270 B2 | 9/2004 |

(Continued)

OTHER PUBLICATIONS

Official Action issued by the Japanese Patent Office on Sep. 16, 2014, in connection with Japanese Patent Application No. 2011-188525.

*Primary Examiner* — Frank Font

(74) *Attorney, Agent, or Firm* — Jean C. Edwards, Esq.; Edwards Neils PLLC

(57) ABSTRACT

To reduce blister defects of a polarizing plate comprising a cured layer of a curable composition. A polarizing plate comprising: a polarizer; a cured layer of a curable composition; and at least one layer containing an iodine scavenger disposed between the polarizer and the cured layer. the iodine scavenger is at least one selected from the group consisting of starches, cyclodextrins, polyvinylpyridines, and polyvinylpyrrolidones.

12 Claims, 3 Drawing Sheets

(51) Int. Cl.
*C08L 39/04* (2006.01)
*C08K 5/29* (2006.01)
*C08L 5/16* (2006.01)

(56) References Cited

U.S. PATENT DOCUMENTS

| | | | |
|---|---|---|---|
| 2009/0103017 A1* | 4/2009 | Maezawa et al. | 349/96 |
| 2010/0324176 A1 | 12/2010 | Seliger et al. | |
| 2011/0001904 A1* | 1/2011 | Tachikawa et al. | 349/96 |
| 2011/0157698 A1 | 6/2011 | Yoshimi | |
| 2011/0262746 A1 | 10/2011 | Arai et al. | |
| 2011/0273646 A1* | 11/2011 | Fukagawa et al. | 349/96 |

FOREIGN PATENT DOCUMENTS

| | | |
|---|---|---|
| JP | 2004-291302 A | 10/2004 |
| JP | 2005-208456 A | 8/2005 |
| JP | 2008-063527 A | 3/2008 |
| JP | 2009-193014 A | 8/2009 |
| JP | 2009-244800 A | 10/2009 |
| JP | 2010-138259 A | 6/2010 |
| JP | 2011-505447 A | 2/2011 |
| JP | 2011-137853 A | 7/2011 |

* cited by examiner (a) mask A  (b) mask B

POLARIZING PLATE, IMAGE DISPLAY APPARATUS INCLUDING THE SAME, AND ADHESIVE COMPOSITION

CROSS-REFERENCE TO RELATED APPLICATIONS

The present application claims the benefit of priority from Japanese Patent Application No. 188525/2011, filed on Aug. 31, 2011, the contents of which are herein incorporated by reference in their entirety.

BACKGROUND OF THE INVENTION

1. Field of the Invention

The present invention relates to a polarizing plate comprising a cured layer of a curable composition, an adhesive composition useful for producing the polarizing plate, and an image display apparatus comprising the polarizing plate.

2. Description of the Related Art

Polarizing plates comprising polarizers to which iodine or dichroic dyes are adsorbed are widely used in, for example, liquid crystal displays. Such a polarizing plate is generally produced by stretching a hydrophilic polymer film such as a polyvinyl alcohol film and allowing iodine or a dichroic dye to be adsorbed onto the film to produce a polarizer, and bonding protective films on both surfaces of the polarizer with an adhesive agent. Many adhesive agents used in production of the polarizing plates also have been proposed (e.g., JP-A-2005-208456, Japanese Patent No. 4306270, and JP-A-2008-63527).

Incidentally, various circular polarizing plates each comprising the above-described polarizer and a λ/4 layer of a curable liquid crystal composition have been proposed as those having a function of converting linearly polarized light into circularly polarized light. The circular polarizing plates having such a structure are used in various fields, for example, 3D image displays (3-dimensional display) that display 3D images using circularly polarized light. Furthermore, various polarizing plates each comprising a cured layer (e.g., a hard coat layer or an antireflection layer) of a curable composition, in addition to the curable liquid crystal composition, have been proposed.

SUMMARY OF THE INVENTION

Unfortunately, blister defects may occur in the polarizing plate comprising a cured layer of a curable composition. The present inventor has extensively investigated the defects and has found that one factor causing the defects is migration of components such as iodine in the polarizer to the cured layer or migration of components in the cured layer to the polarizer. In particular, this defect is predicted to be noticeable in the case of direct bonding of the polarizer and the cured layer in order to reduce the thickness. Many of the cured layers of curable compositions are hydrophobic, whereas many polarizers and their protective films are hydrophilic. It is therefore difficult to bond these layers. The difficulty in bonding may impair the water resistance of the polarizing plate comprising a cured layer to cause peeling by penetrated water from environmental humidity and other moisture causes.

Accordingly, it is an object of the present invention to reduce blister defects of a polarizing plate comprising a cured layer of a curable composition.

It is another object of the present invention to provide a useful adhesive composition for producing a polarizing plate.

Furthermore, it is another object of the present invention to provide an image display apparatus free from blister defects of the polarizing plate.

[1] A polarizing plate comprising:
  a polarizer;
  a cured layer of a curable composition; and
  at least one layer containing an iodine scavenger disposed between the polarizer and the cured layer.

[2] The polarizing plate of [1], wherein the iodine scavenger is at least one selected from the group consisting of starches, cyclodextrins, polyvinylpyridines, and polyvinylpyrrolidones.

[3] The polarizing plate of [1] or [2], wherein the layer containing the iodine scavenger is an adhesive layer.

[4] The polarizing plate of any one of [1] to [3], wherein the layer containing the iodine scavenger is an adhesive layer bonding the cured layer and the polarizer to each other.

[5] The polarizing plate of any one of [1] to [4], wherein the cured layer has an activated surface.

[6] The polarizing plate of any one of [1] to [5], wherein the curable composition contains at least one liquid crystal compound.

[7] The polarizing plate of any one of [1] to [6], wherein the polarizer is a polyvinyl alcohol film.

[8] The polarizing plate of any one of [1] to [7], wherein the cured layer is an optically-anisotropic layer.

[9] The polarizing plate of [8], wherein the optically-anisotropic layer is a patterned optically-anisotropic layer.

[10] An image display apparatus comprising a polarizing plate of any one of [1] to [9].

[11] The image display apparatus of [10], being capable of displaying a 3D image.

[12] An adhesive composition containing an adhesive agent and an iodine scavenger.

[13] The adhesive composition of [12], wherein the iodine scavenger is at least one selected from the group consisting of starches, cyclodextrins, polyvinylpyridines, and polyvinylpyrrolidones.

[14] The adhesive composition of [12] or [13], wherein the adhesive agent contains an isocyanate compound as a main component.

The present invention can reduce the blister defects of a polarizing plate comprising a cured layer of a curable composition.

Furthermore, the present invention can provide a useful adhesive composition for producing a polarizing plate.

In addition, the present invention can provide an image display apparatus free from a problem of blister defects of the polarizing plate.

BEST MODE FOR CARRYING OUT THE INVENTION

Figure 1:
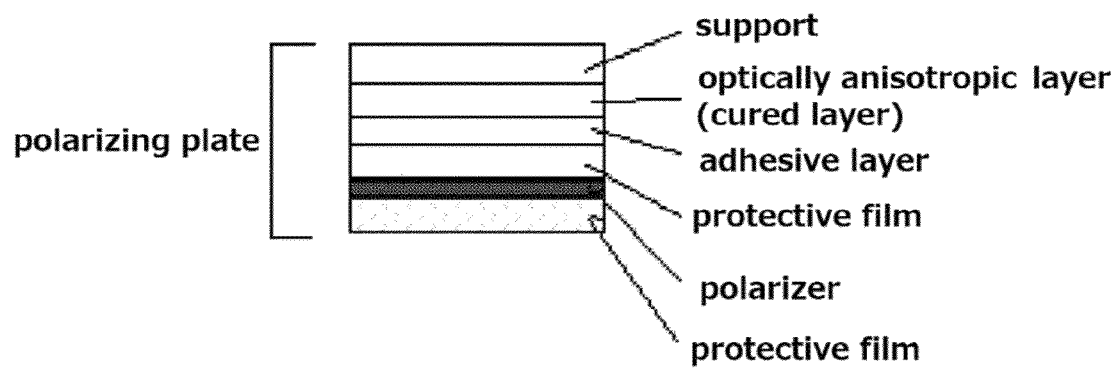
FIG. 1 is a schematic cross-sectional view of an example of the polarizing plate of the present invention.

The invention is described in detail hereinunder. In this description, the numerical range expressed by the wording "a number to another number" means the range that falls between the former number indicating the lowermost limit of the range and the latter number indicating the uppermost limit thereof. First described are the terms used in this description.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (1) and (2):

$$Re(\theta) = \left[ nx - \frac{ny \times nz}{\sqrt{\left\{ ny \sin\left(\sin^{-1}\left(\frac{\sin(\theta)}{nx}\right)\right)\right\}^2 + \left\{nz \cos\left(\sin^{-1}\left(\frac{\sin(\theta)}{nx}\right)\right)\right\}^2}} \right] \times \frac{d}{\cos\left(\sin^{-1}\left(\frac{\sin(\theta)}{nx}\right)\right)} \quad (1)$$

$Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \quad (2)$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, $Nz=(nx-nz)/(nx-ny)$ is further calculated.

It is difficult to accurately and directly measure θ1, which is a tilt angle at a surface of an optically-anisotropic film (an angle between the physical symmetric axis of a discotic or rod-like liquid-crystal molecule in the optically-anisotropic film and an interface of the layer), and θ2, which is a tilt angle at another surface of the optically-anisotropic film. Therefore, in this description, θ1 and θ2 are calculated as follows: This method could not accurately express the actual alignment state, but may be helpful as a means for indicating the relative relationship of some optical characteristics of an optical film.

In this method, the following two points are assumed for facilitating the calculation, and the tilt angles at two interfaces of an optically-anisotropic film are determined.

1. It is assumed that an optically-anisotropic film is a multi-layered structure that comprises a layer containing discotic or rod-like compound(s). It is further assumed that the minimum unit layer constituting the structure (on the assumption that the tilt angle of the liquid crystal compound molecule is uniform inside the layer) is an optically-monoaxial layer.

2. It is assumed that the tilt angle in each layer varies monotonously as a linear function in the direction of the thickness of an optically-anisotropic layer.

A concrete method for calculation is as follows:

(1) In a plane in which the tilt angle in each layer monotonously varies as a linear function in the direction of the thickness of an optically-anisotropic film, the incident angle of light to be applied to the optically-anisotropic film is varied, and the retardation is measured at three or more angles.

For simplifying the measurement and the calculation, it is desirable that the retardation is measured at three angles of −40°, 0° and +40° relative to the normal direction to the optically-anisotropic film of being at an angle of 0°. For the measurement, for example, used are KOBRA-21ADH and KOBRA-WR (by Oji Scientific Instruments), and transmission ellipsometers AEP-100 (by Shimadzu), M150 and M520 (by Nippon Bunko) and ABR10A (by Uniopto).

(2) In the above model, the refractive index of each layer for normal light is represented by n0; the refractive index thereof for abnormal light is by ne (ne is the same in all layers as well as n0); and the overall thickness of the multi-layer structure is represented by d. On the assumption that the tilting direction in each layer and the monoaxial optical axis direction of the layer are the same, the tilt angle θ1 in one face of the optically-anisotropic layer and the tilt angle θ2 in the other face thereof are fitted as variables in order that the calculated data of the angle dependence of the retardation of the optically-anisotropic layer could be the same as the found data thereof, and θ1 and θ2 are thus calculated.

In this, n0 and ne may be those known in literature and catalogues. When they are unknown, they may be measured with an Abbe's refractometer. The thickness of the optically-anisotropic film may be measured with an optical interference thickness gauge or on a photograph showing the cross section of the layer taken by a scanning electronic microscope.

The present invention relates to a polarizing plate comprising a polarizer and a cured layer of a curable composition, wherein at least one layer lying between the polarizer and the cured layer contains an iodine scavenger. In the present invention, the layer containing an iodine scavenger disposed between a polarizer and a cured layer inhibits migration of iodine or any other component in the polarizer to the cured layer and/or migration of any component in the cured layer to the polarizer. This prevents occurrence of blister defects and thus maintains satisfactory performance of the polarizing plate.

In a preferred embodiment of the present invention, an adhesive layer disposed between the polarizer and the cured layer contains the iodine scavenger. In this embodiment, the iodine scavenger in the adhesive layer inhibits iodine in the polarizer from migrating into the cured layer and/or inhibits the component in the cured layer from migrating into the polarizer and also notably increases the adhesiveness between the cured layer and the hydrophilic polarizer or between the cured layer and a protective film of the polarizer, regardless of the hydrophobicity of the cured layer. It has not been expected that addition of an iodine scavenger to an adhesive layer can inhibit occurrence of blister defects in a polarizing plate comprising a cured layer and also can notably increase the adhesion of the adhesive layer.

Embodiments of the present invention will now be described with reference to the drawings. The relative thickness of each layer in the drawings does not reflect its actual relative thickness. In the drawings, the same members are designated by the same reference characters, and detailed descriptions thereof may be omitted.

FIG. 1 shows a schematic cross-sectional view of an example of the polarizing plate of the present invention. In the drawing, the relative thickness of each layer is not necessarily the same as the actual relative thickness.

The polarizing plate shown in FIG. 1 comprises a protective film for protecting the polarizer on each surface of the polarizer and an optically-anisotropic layer disposed on one of the protective films with an adhesive layer therebetween, where the adhesive layer contains an iodine scavenger. The optically-anisotropic layer is a cured layer of a curable liquid crystal composition and is formed by applying the curable liquid crystal composition onto a support and curing it.

Examples of the polarizer include iodine polarizers, dichroic dye polarizers, and polyene polarizers, and any of them can be used in the present invention. In the present invention, an iodine polarizer of a polyvinyl alcohol film is preferred.

The protective film disposed between the polarizer and the optically-anisotropic layer may be optically isotropic or anisotropic. An optically isotropic protective film, which does not affect optical characteristics of the optically-anisotropic layer, is preferred. In an optically-anisotropic protective film, for example, the optically-anisotropic layer and the protective film may provide desired optical characteristics (e.g., λ/4) as a whole. The protective film is preferably a transparent polymer film such as a cellulose acylate film or a polyolefin film containing polyolefin. Of the cellulose acylate films, cellulose triacetate films are preferred. In FIG. 1, the protective film can be omitted, that is, a surface of the optically-anisotropic layer and a surface of the polarizer may be directly bonded to each other with the adhesive layer containing an iodine scavenger.

The protective film disposed on the other surface of the polarizer may also be optically isotropic or anisotropic, and examples of the material thereof are the same as those of the above-described protective film. For example, in the case of the polarizing plate shown in FIG. 1 used as a polarizing plate for a liquid crystal display, the protective film is disposed between a liquid crystal cell and a polarizer and may therefore function as an optically-compensation film for compensating for, for example, birefringence of the liquid crystal cell.

In the embodiment shown in FIG. 1, the adhesive layer bonds a protective film and a cured layer to unify them and is preferably optically isotropic. Examples of the main component of the adhesive agent used in the adhesive layer include isocyanate compounds and acrylate compounds. Any adhesive agent that is generally classified as a tackifier may be used, when the adhesive layer can bond the protective film and the cured layer to unify them. The adhesive layer further contains an iodine scavenger. The adhesive agent and the iodine scavenger that can be used are described in detail later.

The optically-anisotropic layer is preferably formed of a curable liquid crystal composition of which the main component is a liquid crystal compound having a polymerizable group. The materials of the liquid crystal compound that can be used are described in detail later.

Figure 2:
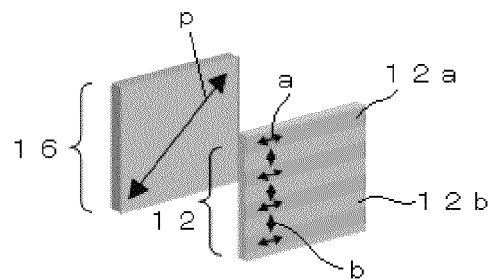
FIG. 2 is a schematic view illustrating an exemplary relationship between a polarizer and an optically-anisotropic layer.
Figure 3:
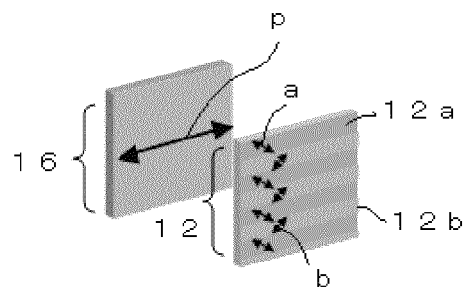
FIG. 3 is a schematic view illustrating another exemplary relationship between a polarizer and an optically-anisotropic layer.

An example of the optically-anisotropic layer is a patterned optically-anisotropic layer where first and second retardation regions are uniformly and symmetrically arranged. For example, in the patterned optically-anisotropic layer, the in-plane retardation of each of the first and second retardation regions is about λ/4, and in-plane slow axes are orthogonal to each other. In this example, as shown in FIGS. 2 and 3, an optically-anisotropic layer 12 is disposed in such a manner that the respective in-plane slow axes a and b of first and second retardation regions 12a and 12b each define an angle of ±45° with respect to the transmission axis P of a viewing-side polarizer 16. This configuration can segment a circularly polarized image into those for right and left eyes. The viewing angle may be widened by further laminating a λ/2 plate.

A circularly polarized image can also be segmented similarly by using an optically-anisotropic layer having first and second retardation regions 12a and 12b of which one has an in-plane retardation of λ/4 and the other has an in-plane retardation of 3λ/4. A linearly polarized image may be segment into those for right and left eyes by using an optically-anisotropic layer having first and second retardation regions 12a and 12b of which one has an in-plane retardation of λ/4 and the other has an in-plane retardation of 3λ/4.

A circularly polarized image can also be segmented similarly by using an optically-anisotropic layer having first and second retardation regions 12a and 12b of which one has an in-plane retardation of λ/2 and the other has an in-plane retardation of 0 and laminating the optically anisotropic layer on a transparent support having an in-plane retardation of λ/4 in such a manner that their slow axes are parallel or orthogonal to each other.

Figure 4:
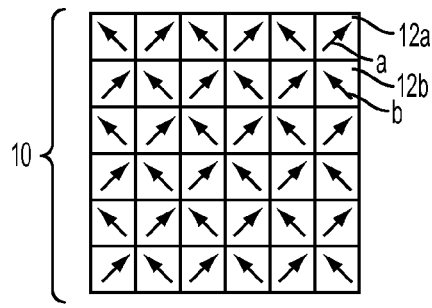
FIG. 4 is a schematic top view of an example of a patterned optically-anisotropic layer according to the present invention.

In addition, the shapes and the array pattern of the first and second retardation regions 12a and 12b are not limited to the embodiment of a stripe pattern shown in FIGS. 2 and 3. As shown in FIG. 4, the array may be a rectangular grid pattern.

In the embodiment where first and second retardation regions 12a and 12b each has an in-plane retardation of about λ/4, the in-plane slow axes a and b each preferably define an angle of ±45° with respect to the transmission axis of the polarizer. Throughout the specification, the angle is not required to strictly be ±45°, and, preferably, either the first or second retardation region 12a or 12b defines an angle of 40° to 50°, and the other defines an angle of −50° to −40°.

The optically-anisotropic layer 12 itself is not required to have an in-plane retardation Re of λ/4. The total in-plane retardation Re of the members, including the optically-anisotropic layer 12, disposed at one surface side of the polarizer 16 is preferably 110 to 160 nm, more preferably, 120 to 150 nm, and most preferably 125 to 145 nm.

When the polarizing plate is disposed in a display panel, the total thickness-direction retardation Rth of the members disposed on the viewing side than the polarizer affects viewing angle characteristics, and therefore a smaller absolute value of the Rth is preferred. Specifically, the Rth is preferably −100 to 100 nm, more preferably −60 to 60 nm, and most preferably −60 to 20 nm.

In the polarizing plate shown in FIG. 1, preferably the activation treatment of the surface of the optically-anisotropic layer further enhances the adhesion. Examples of the activation treatment include corona discharge treatment, plasma treatment, ultraviolet irradiation, electron beam irradiation, and application of anchoring agent. Specific examples of the surface activation treatment are disclosed in Japanese Patent No. 3427130.

The polarizing plate of the present invention is not limited to the configuration shown in FIG. 1. For example, the polarizing plate may include a plurality of cured layers serving as, for example, optically-anisotropic layers or may include any other functional layer in addition to or instead of the optically-anisotropic layer. Examples of the other functional layer include diffusion layers, antihalation layers, and antireflection layers, and a surface film having one of these layers may be laminated. Furthermore, an alignment film may be disposed between the optically-anisotropic layer and the support.

Figure 5:
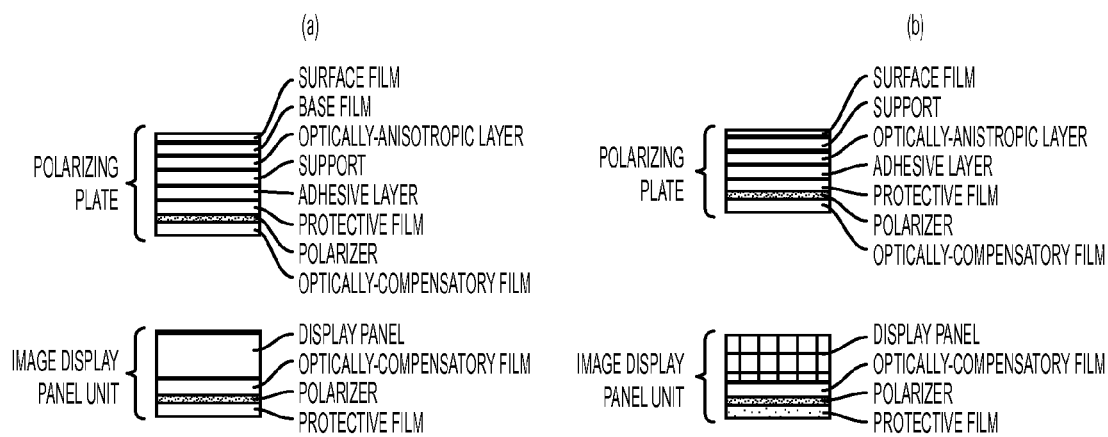
FIG. 5 includes schematic cross-sectional views of image display apparatuses of the present invention.

FIG. 5 includes schematic cross-sectional views of examples of the polarizing plate of the present invention in combination with a display panel unit. In the polarizing plate of the present invention, as shown in FIG. 5(a), a surface layer, an optically-anisotropic layer, a support, an adhesive layer, a protective film, a polarizer, and an optically-compensatory film may be laminated in this order from the viewing side; as shown in FIG. 5(b), a surface layer, a support, an optically-anisotropic layer, an adhesive layer, a protective film, a polarizer, and an optically-compensatory film may be laminated in this order from the viewing side; or as shown in FIG. 5(c), a surface layer, an optically-anisotropic layer, a transparent support, an adhesive layer, a polarizer, and an optically-compensatory film may be laminated in this order from the viewing side. Furthermore, as shown in FIG. 5(d), an embodiment where a polarizer and a cured layer are directly bonded to each other with an adhesive layer, i.e., a surface layer, a transparent support, an optically-anisotropic layer, an adhesive layer, a polarizer, and an optically-compensatory film may be laminated in this order from the viewing side. From the viewpoint of a reduction in thickness, embodiments shown in FIGS. 5(b) and 5(d) are preferred.

The present invention also relates to an image display apparatus. The image display apparatus of the present invention comprises at least an image display panel unit that is driven based on image signals and a polarizing plate of the present invention. In one embodiment, the polarizing plate of the present invention is disposed on the viewing-side surface of the image display panel unit, and the image display apparatus can display 3D images. In this embodiment, the polarizing plate of the present invention has a function of converting an image to be displayed by the image display panel unit into polarized images for right and left eyes, such as circularly polarized images or linearly polarized images. A viewer observes these images via a polarizing plate such as circularly or linearly polarized glasses to recognize the images as a 3D image.

The present invention can use any display panel. For example, the display panel may be a liquid crystal panel comprising a liquid crystal layer, an organic EL display panel comprising an organic EL layer, or a plasma display panel. These panels can have various configurations. For example, a liquid crystal panel of a transparent mode generally has a polarizer for displaying an image on the viewing-side surface. Accordingly, in this embodiment, the polarizer in the polarizing plate of the present invention may function as the polarizer for displaying images. In the case of a display panel comprising a polarizer on the viewing-side surface, in addition to the polarizer of the polarizing plate of the present invention, the two polarizers are disposed such that the transmission axis of the polarizer of the polarizing plate of the present invention is aligned with the transmission axis of the polarizer of the display panel.

In the case of a display panel of a liquid crystal cell, the display panel is of a transparent mode where a backlight is disposed on the rear side of the liquid crystal cell, and a polarizer is disposed between the backlight and the liquid crystal cell.

The liquid crystal cell can have a general configuration without any limitation. The liquid crystal cell comprises, for example, a pair of substrates (not shown) disposed so as to oppose each other, a liquid crystal layer disposed between the substrates, and optionally a color filter layer and other layers. The liquid crystal cell can employ any drive mode such as a twisted nematic (TN), super twisted nematic (STN), vertical alignment (VA), in-plane switching (IPS), or optically compensated bend cell (OCB) mode. In the TN mode, in general, the polarizer is disposed such that the transmission axis defines an angle of 45° or 135° with respect to 0° in the horizontal direction of the display surface. Accordingly, the TN mode liquid crystal panel is preferably combined with a retardation film of the embodiment shown in FIG. 2. In the VA mode and the IPS mode, in general, the polarizer is disposed such that the transmission axis defines an angle of 0° or 90° with respect to 0° in the horizontal direction of the display surface. Accordingly, the VA or IPS mode liquid crystal panel is preferably combined with a retardation film of the embodiment shown in FIG. 3.

Materials that are used for producing the polarizing plate of the present invention will now be described in detail.

Iodine Scavenger

The polarizing plate of the present invention comprises at least one layer containing an iodine scavenger.

The iodine scavenger is preferably at least one selected from cyclodextrins, starches, polyvinylpyridines, and polyvinylpyrrolidones.

Cyclodextrins are known to generally incorporate iodine and form inclusion compounds (JP-A-2002-193719). That is, in the present invention, a cyclodextrin used as the iodine scavenger incorporates iodine in the adhesive composition therein to inhibit the iodine from migrating to the optically-anisotropic layer.

For starches used as the iodine scavengers, iodine in the adhesive composition penetrates into the inside of the spiral structure of starch molecules and does not migrate into the optically-anisotropic layer (iodine-starch reaction, formation of inclusion compound).

For polyvinylpyridines used as the iodine scavengers, iodine and a polyvinylpyridine form a charge-transfer complex (CT complex) to inhibit the iodine from migrating into the optically-anisotropic layer. For polyvinylpyrrolidones used as the iodine scavengers, a polyvinylpyrrolidone and iodine form a complex to inhibit the iodine from migrating into the optically-anisotropic layer. It has been traditionally known that a polymer of 1-vinyl-2-pyrrolidone (polyvinylpyrrolidone) and iodine form a complex (povidone-iodine), which is practically used as a gargle.

Iodine scavengers based on these principles (e.g., formation of inclusion compounds and formation of charge-transfer complexes) are included in the specification.

The solid content in the iodine scavenger is not particularly limited as long as each component is uniformly dissolved in solvent and is, for example, preferably 0.5 to 50% by mass, more preferably 1 to 30% by mass, more preferably 1 to 25% by mass, and most preferably 1 to 15% by mass. Here, the solid content refers to all components of the adhesive composition other than the solvent.

Cyclodextrins

The cyclodextrin is also called a cyclic oligosaccharide where α-D-glucopyranose groups are connected to each other via α-1,4-glycosidic linkages to form a cycle. The cyclodextrins are classified based on the number of pyranose groups into α-type (cyclohexaamylose structure having six pyranose groups, porosity: 0.45 to 0.60 nm), β-type (cycloheptaamylose having seven pyranose groups, porosity: 0.70 to 0.80 nm), γ-type (cyclooctaamylose having eight pyranose groups, porosity: 0.85 to 1.0 nm), and δ-type (cyclononaamylose having nine pyranose groups).

A glucose unit has hydroxyl groups at the 2-position, 3-position, and 6-position. The hydroxyl group at the 6-position is a primary hydroxyl group, and the hydroxyl groups at the 2- and 3-positions are secondary hydroxyl groups.

The present invention can use the following cyclodextrin compounds: an α-type, β-type, γ-type, or δ-type cyclodextrin (case 1); a chemically modified cyclodextrin where a hydroxyl group of the cyclodextrin in case 1 is replaced with an organic group represented by Formula (1) (case 2); or a mixture of cyclodextrins in cases 1 and 2 (case 3).

In case 1, the hydroxyl groups contained in a cyclodextrin molecule are not chemically modified.

In case 2, some of hydroxyl groups contained in a cyclodextrin molecule are chemically modified, and 10 to 90% of all the hydroxyl groups at the 2-, 3-, and 6-positions are chemically modified with the organic groups represented by Formula (1).

The iodine scavenger can be a chemically modified cyclodextrin where a hydroxyl group is replaced with an organic group represented by Formula (1):

In Formula (1), $R^1$ represents an alkyl group having 1 to 10 carbon atoms or an aromatic group, each optionally substituted by a group selected from the group consisting of halogen groups, alkoxy groups having 1 to 6 carbon atoms, and phenyl, cyano, and nitro groups, or represents a group represented by Formula (2):

In Formula (2), $R^2$ represents an alkyl group having 1 to 10 carbon atoms or an aromatic group, each optionally substituted by a group selected from the group consisting of halogen groups, alkoxy groups having 1 to 6 carbon atoms, and phenyl, cyano, and nitro groups.

In Formula (1), examples of the alkyl group having 1 to 10 carbon atoms include methyl, ethyl, isopropyl, n-pentyl, cyclohexyl, and n-octyl groups. Examples of the alkoxy group having 1 to 6 carbon atoms include methoxy, ethoxy, isopropyloxy, and cyclohexyloxy groups. Examples of the halogen group include chloro, fluoro, bromo, and iodo groups. Examples of the aromatic group include carbocyclic aromatic groups such as benzene, naphthalene, and anthracene rings and nitrogen-containing aromatic groups such as pyridine, pyrimidine, triazine, thiazole, and imidazole rings.

When $R^1$ in Formula (1) is the above-mentioned alkyl group having 1 to 10 carbon atoms or aromatic group, the hydroxyl group of the cyclodextrin is replaced with an ether group. When $R^1$ is a group represented by Formula (2), the hydroxyl group of the cyclodextrin is replaced with an ester group.

The cyclodextrin is a compound having a large number of hydroxyl groups and has low solubility in solvent. Accordingly, a cyclodextrin compound having improved solubility in solvent by replacing the hydroxyl group with an ether group or an ester group may be used. In the cyclodextrin compound, 10% or more, for example, 10% to 90%, 20% to 80%, or 30% to 60% of the total number of the hydroxyl groups contained in cyclodextrin is preferably replaced with the group represented by Formula (1), i.e., an ether group or an ester group. Groups represented by Formula (1) in the cyclodextrin compound may be ether groups only or ester groups only or may include both ether and ester groups.

Specific examples of $R^1$ in Formula (1) include methyl, ethyl, isopropyl, cyclohexyl, n-octyl, cyanomethyl, methoxymethyl, benzyl, chloropropyl, phenyl, naphthyl, anthryl, fluorophenyl, pyridyl, 2-pyrimidinyl, triazinyl, 4,6-dimethoxytriazin-2-yl, 2,4-dinitrophenyl, and 2-chlorotriazin-4-yl groups.

Specific examples of $R^2$ in Formula (2) include methyl, ethyl, isopropyl, cyclohexyl, n-octyl, phenylethyl, trifluoromethyl, chloromethyl, cyanomethyl, phenyl, naphthyl, anthryl, fluorophenyl, ethoxymethyl, bromophenyl, chloronaphthyl, nitrophenyl, pyridyl, 2-pyrimidinyl, triazinyl, benzyl, 2-thiazolyl, and 2-benzoxazolyl groups.

A chemically modified cyclodextrin used in the present invention, where 10 to 90% of hydroxyl groups of the cyclodextrin are replaced with organic groups represented by Formula (1), can be prepared by the following process.

For example, a cyclodextrin compound wherein $R^1$ in Formula (1) is the above-mentioned alkyl group having 1 to 10 carbon atoms or aromatic group can be prepared through a reaction of a cyclodextrin with an alkyl or aromatic compound having a leaving group in the presence of a base in an appropriate solvent. Examples of the alkyl compound having a leaving group include methyl iodide, ethyl iodide, 2-iodopropane, 1-bromopentane, benzyl bromide, methoxy methyl chloride, bromoacetonitrile, and 1-bromooctane. Examples of the aromatic compound having a leaving group include 2-chlorotriazine, 2-chloro-4,6-dimethoxytriazine, 2-chloropyrimidine, and 2,4-dinitrochlorobenzene. Examples of the base include sodium hydroxide, sodium carbonate, sodium acetate, potassium carbonate, sodium methoxide, pyridine, 4-(N,N-dimethylamino)pyridine, and triethylamine.

For example, a cyclodextrin compound wherein $R^1$ in Formula (1) is the above-mentioned aromatic group can be prepared through a reaction of a cyclodextrin with an aromatic compound having a phenolic hydroxyl group in the presence of triphenylphosphine and diethyl azodicarboxylate in an appropriate solvent (Mitsunobu reaction). Examples of the aromatic compound having a phenolic hydroxyl group include phenol, p-cresol, 1-naphthol, 2-naphthol, 2-hydroxyanthracene, 9-hydroxyanthracene, 4-hydroxypyridine, and 3-hydroxypyridine.

A cyclodextrin compound wherein $R^1$ in Formula (1) is a group represented by Formula (2) can be prepared by replacing a hydroxyl group with an ester group through a reaction of a cyclodextrin with an acid chloride, an acid bromide, a carbonylimidazole compound, a carboxylic acid active ester compound, or an acid anhydride. For example, a hydroxyl group of a cyclodextrin can be replaced with an acetyloxy group through a reaction of the cyclodextrin with acetyl chloride or acetic acid anhydride in the presence of a base such as pyridine.

Replacement of a hydroxylic acid with an ester group can use an acid chloride, an acid bromide, a carbonylimidazole compound, or a carboxylic acid active ester compound induced from a carboxylic acid compound such as acetic acid, propionic acid, butyric acid, cyclohexanecarboxylic acid, chloroacetic acid, trifluoroacetic acid, cyanoacetic acid, ethoxyacetic acid, isobutyric acid, benzoic acid, bromobenzoic acid, hydroxybenzoic acid, iodobenzoic acid, nitrobenzoic acid, methylbenzoic acid, ethoxybenzoic acid, tert-butoxybenzoic acid, naphthalenecarboxylic acid, chloronaphthalenecarboxylic acid, hydroxynaphthalenecarboxylic acid, or anthracenecarboxylic acid. Anhydrides of these carboxylic acid compounds can also be used. The hydroxyl group of a cyclodextrin can also be replaced with an ester group through a reaction of a cyclodextrin with the above-mentioned carboxylic acid compound in the presence of a condensing agent such as dicyclohexyl carbodiimide.

The replacement rate of hydroxyl groups of a cyclodextrin by ester groups can be adjusted by changing the stoichiometric proportion of the acid chloride, acid bromide, carbonylimidazole compound, carboxylic acid active ester compound, and acid anhydride to be used.

The quantity of hydroxyl groups remaining in the cyclodextrin compound can be measured by a usual method of determining hydroxyl value. For example, the quantity of remaining hydroxyl groups of a cyclodextrin compound can be measured by acetylating the cyclodextrin compound with acetic anhydride in the presence of pyridine, converting excess acetic anhydride into acetic acid by adding water, and quantitatively determining the amount of this acetic acid with an alkali.

The cyclodextrin and chemically modified cyclodextrin is hydrophobic inside the crown-like structure of the cyclodextrin, but hydrophilic outside the structure. In order to dissolve these compounds in an organic solvent having high hydrophobicity, the hydrophilic structure (hydroxyl groups) on the outside of the cyclodextrin is necessary to be partially converted to organic groups having affinity to the organic solvent through chemical modification. For this purpose, a chemically modified cyclodextrin having a structure where 10 to 90% of hydroxyl groups of the cyclodextrin have been replaced with the organic groups represented by Formula (1) can be used. Use of an organic solvent having high hydrophilicity enables a hydroxyl group-unmodified cyclodextrin itself or a chemically modified cyclodextrin having low replacement rate (e.g., about 10 to 30%) of hydroxyl groups by organic groups represented by Formula (1) to be used.

An inclusion compound and the cyclodextrin fundamentally form a complex at a molar ratio of 1:1. A bulky inclusion compound, however, can form a complex with the cyclodextrin at a molar ratio of 1:2. This complex has a barrel shape where an inclusion molecule lies between two cyclodextrin molecules in such a manner that the bottom (secondary hydroxyl group side) of the chair conformation of each cyclodextrin molecule faces the inclusion molecule. Depending on the shape of the inclusion compound, the inclusion compound and the cyclodextrin can form a complex at a molar ratio of 1:3 or 1:4. Accordingly, the rate of an inclusion compound in a cyclodextrin is shown as a rate of the inclusion molecules in the total cyclodextrin molecules.

For example, an iodine inclusion complex of β-cyclodextrin (β-cyclodextrin iodine complex) having an effective iodine content of 5 to 20% by mass is commercially available. An iodine inclusion complex of methylated-β-cyclodextrin (methyl-β-cyclodextrin iodine complex: hydroxyl groups are partially replaced with methoxy groups) having an effective iodine content of 3 to 15% is also commercially available.

Starches

The plants from which starch molecules used in the present invention are derived may be cereals or potatoes. The starch is selected from, for example, corn starch, rice starch, cassava starch, barley starch, potato starch, wheat starch, sweet sorghum starch, and pea starch.

The starch that is used as the iodine scavenger is preferably modified. Preferably, the starch is chemically or physically modified, in particular, through at least one of the following reactions: gelatinization, oxidation, crosslinking, esterification, etherification, amidation, and heat treatment.

These modifications are preferably performed by the following processes:

Gelatinization through fragmentation of starch grains (e.g., by drying and cooking in a drying drum);

Oxidation with a strong oxidizing agent to introduce carboxyl groups into starch molecules and also cause depolymerization of the starch molecules (e.g., through treatment of an aqueous starch solution with sodium hypochlorite);

Crosslinking of hydroxyl groups of starch molecules with a reactive functional agent and thereby forming chemical bonds (e.g., with glyceryl and/or phosphate groups); and Esterification in an alkaline medium for grafting of functional groups, in particular, C1-C6 acyl (acetyl), C1-C6 hydroxyalkyl (hydroxyethyl or hydroxypropyl), carboxymethyl, or octenyl succinate groups.

The starch may be those prepared by crosslinking of distarch phosphate (of an Am—O—PO—(OX)—O—Am type), tristarch phosphate (of an Am—O—PO—(O—Am)$_2$ type), or a mixture thereof with, in particular, monostarch phosphate (of an Am—O—PO—(OX)$_2$ type) and a phosphorus compound.

Specific examples of X include alkali metals (e.g., sodium and potassium), alkaline earth metals (e.g., calcium and magnesium), ammonium salts, amine salts, (e.g., ammonium or amine salts of monoethanolamine, diethanolamine, triethanolamine, and 3-amino-1,2-propanediol), and ammonium salts derived from basic amino acids such as lysine, arginine, sarcosine, ornithine, and citrulline.

Examples of the phosphorus compound include sodium tripolyphosphate, sodium orthophosphate, phosphorus oxychloride, and sodium trimetaphosphate.

The iodine scavengers are preferably distarch phosphates and compounds rich in distarch phosphate, for example, Pregel VA-70-T AGGL (gelatinized hydroxypropyl cassava distarch phosphate), Pregel TK1 (gelatinized cassava distarch phosphate), and Pregel 200 (gelatinized acetyl cassava distarch phosphate) available from Avebe, and Structure Zea (gelatinized corn distarch phosphate) available from National Starch.

The starch preferably has undergone at least one chemical modification, e.g., at least one esterification.

The iodine scavengers may be amphoteric starches. The amphoteric starch may contain one or more anionic groups and one or more cationic groups. The anionic and cationic groups may be linked to the same reactive site or different sites of the starch molecule and are preferably linked to the same reactive site. The anionic group may be of a carboxylate, phosphate, or sulfate type. The cationic group may be of a primary, secondary, tertiary, or quaternary amine type.

The amphoteric starch is preferably selected from the compounds represented by the following formulae:

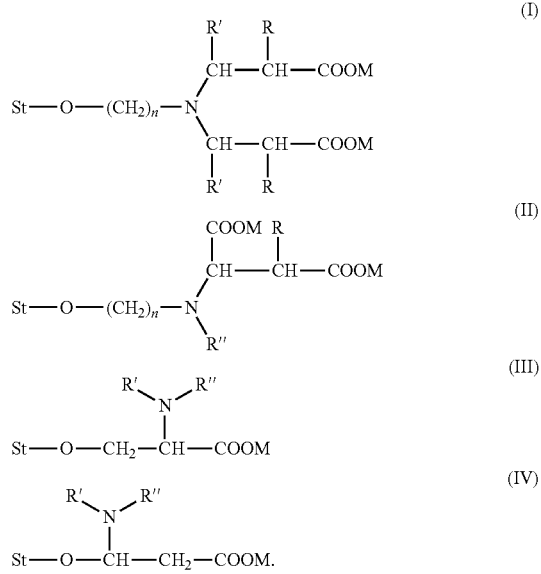

In the formulae, St-O represents a starch molecule; Rs may be the same or different and each represent a hydrogen atom or a methyl group; R's may be the same or different and each represent a hydrogen atom, a methyl group, or a —COOH group; n represents an integer of 2 or 3; Ms may be the same or different and each represent a hydrogen atom, an alkali metal, or an alkaline earth metal, such as Na, K, or Li, or NH$_4$, a quaternary ammonium, or an organic amine; and R" represents a hydrogen atom or an alkyl group having 1 to 18 carbon atoms.

These compounds are described in U.S. Pat. Nos. 5,455,340 and 4,017,460, the contents of which are incorporated by reference herein.

The starch molecules may be derived from any plant source of starch, particularly such as corn, potato, barley, rice, tapioca, sorghum, and wheat.

Furthermore, starch hydrolyzates also can be used. The starch hydrolyzates are preferably those derived from potato.

Starches represented by Formula (I) or (II) are preferably used. In particular, starches modified with 2-chloro-ethylaminodipropionic acid, i.e., starches represented by Formula (I) or (II) where R, R', R", and M represent hydrogen atoms, and n is 2 are preferably used. A preferred amphoteric starch is starch chloroethylamidodipropionate.

Polyvinylpyridines

Examples of the polyvinylpyridine used as the iodine scavenger include 4-vinylpyridine, 3-vinylpyridine, and 2-vinylpyridine (those may have various substituents). These may be used alone or in combination. The polymer formed has a weight average molecular weight (Mw) of 5000 to 1000000, preferably 10000 to 100000, and more preferably 15000 to 50000.

Polyvinylpyrrolidones

Examples of the polyvinylpyrrolidone used as the iodine scavenger include 1-vinyl-2-pyrrolidone (which may have various substituents). The polymer formed has a weight average molecular weight (Mw) of 5000 to 1000000, preferably 10000 to 100000, and more preferably 15000 to 50000.

Adhesive Layer

The iodine scavenger is preferably added to the adhesive layer. The adhesive agent as the main component contained in the adhesive layer may be a hydrophilic adhesive agent or a hydrophobic adhesive agent.

An example of the hydrophilic adhesive agent is an adhesive agent containing a water dispersion type isocyanate compound. The isocyanate adhesive agent may be, for example, a compound having an isocyanate group at the end or a prepolymer (urethane prepolymer) or polymer having an isocyanate group at the end. The hydrophilic adhesive agent may be either of a one-component or two-component type. Specifically, these adhesive agents are described in Japanese Patent Nos. 3724792 and 3962253, the contents of which are incorporated by reference herein.

Another example of the hydrophilic adhesive agent is an adhesive agent prepared by addition of an isocyanate to an aqueous polyvinyl alcohol (PVA) solution, more specifically, prepared by addition of an isocyanate having at least two isocyanate groups in its molecule to an aqueous PVA solution or emulsion. Specifically, such adhesive agents are described in JP-A-2001-305345, the content of which is incorporated by reference herein.

A typical example of the hydrophobic adhesive agent is an ultraviolet-curable composition containing a urethane (meth)acrylate macromonomer. The urethane (meth)acrylate macromonomer can be prepared by reactions of a polyol compound, a polyisocyanate compound, and a hydroxyl-containing (meth)acrylate compound. Specifically, such adhesive agents are described in JP-A-2008-63527 and Japanese Patent Application No. 2011-077782, the contents of which are incorporated by reference herein.

Cured Layer

The polarizing plate of the present invention comprises a cured layer of a curable composition. An example of the cured layer is an optically-anisotropic layer composed of a curable liquid crystal composition.

Optically-Anisotropic Layer

The optically-anisotropic layer is preferably a patterned optically-anisotropic layer having first retardation regions and second retardation regions alternately disposed in a plane, where the in-plane slow axis directions of the first and second retardation regions are different from each other and/or the in-plane retardations of the first and second retardation regions are different from each other. In one example of the optically-anisotropic layer, the first and second retardation regions each have an Re of about λ/4, and the in-plane slow axes are orthogonal to each other. Such an optically-anisotropic layer can be formed in a variety of manners. In the present invention, the optically-anisotropic layer is preferably formed by polymerization of liquid crystal molecules having polymerizable groups in a vertically or horizontally aligned state and immobilizing them.

The Re of the optically-anisotropic layer itself may be about λ/4. In such a case, the Re (550) is preferably 110 to 165 nm, more preferably 120 to 150 nm, and most preferably 125 to 145 nm.

In general, liquid crystal compounds are classified into a rod type and a discotic type based on their shapes. Furthermore, each type includes a low-molecular type and a high-molecular type. The "high molecular type" generally means a polymer having a degree of polymerization of 100 or more (Kobunshi Butsuri Souten-i Dainamikusu (Polymer Physics and Phase Transition Dynamics), written by Masao Doi, p. 2, Iwanami Shoten, Publishers, 1992). In the present invention, any liquid crystal compound can be used, and can be a rod-like liquid crystal compound or a discotic liquid crystal compound. Furthermore, two or more rod-like liquid crystal compounds, two or more discotic liquid crystal compounds, or a mixture of rod-like and discotic liquid crystal compounds may be used. From the viewpoints of reducing changes in temperature and humidity, the optically-anisotropic layer is more preferably formed of a rod-like or discotic liquid crystal compound having one or more reactive groups. More preferably, at least one liquid crystal compound has two or more reactive groups in one liquid crystal molecule. A mixture of two or more liquid crystal compounds may be used. In such a case, at least one liquid crystal compound preferably has two or more reactive groups.

It is also preferred the liquid crystal compound have two or more reactive groups having different polymerization characteristics. In this case, a retardation layer containing a polymer having unreacted reactive groups can be produced through selective polymerization of the different reactive groups under controlled conditions. The difference in polymerization conditions may be a difference in wavelength region of ionizing radiation for polymerization immobilization or a difference in polymerization mechanism, but is preferably a difference in combination of a radical reactive group and a cationic reactive group, which is controllable by the type of a polymerization initiator. A combination of a radical reactive group of an acrylic and/or methacrylic group and a cationic reactive group of a vinyl ether, oxetane, and/or epoxy group facilitates the control of the reactivity and is therefore particularly preferred.

[Rod-Like Liquid Crystal Compound Having Polymerizable Group]

Examples of the rod-like liquid crystal compound preferably used include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexyl benzonitriles. In addition to these low-molecular liquid crystal compounds, high-molecular liquid crystal compounds also can be used. The high-molecular liquid crystal compounds are polymerization products of low-molecular rod-like liquid crystal compounds having reactive groups. Particularly preferred examples of the low-molecular rod-like liquid crystal compounds having reactive groups are represented by the following Formula (I):

$$Q^1\text{-}L^1\text{-}A^1\text{-}L^3\text{-}M\text{-}L^4\text{-}A^2\text{-}L^2\text{-}Q^2 \quad \text{Formula (I)}$$

where, $Q^1$ and $Q^2$ each independently represent a reactive group; $L^1$, $L^2$, $L^3$, and $L^4$ each independently represent a single bond or a divalent linker; $A^1$ and $A^2$ each independently represent a spacer having 2 to 20 carbon atoms; and M represents a mesogenic group.

Nonlimiting examples of the compound represented by Formula (I) are shown below. The compounds represented by Formula (I) can be synthesized by a method described in National Publication of International Patent Application No. Hei 11-513019 (WO97/00600).

I-1

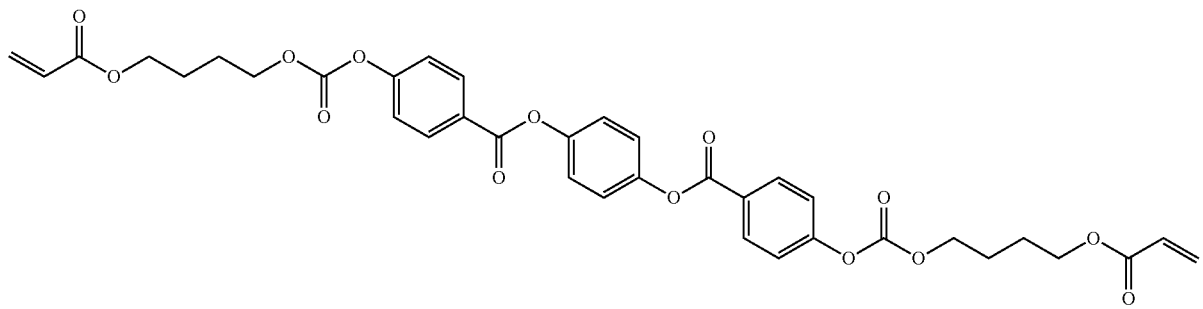

-continued
I-2
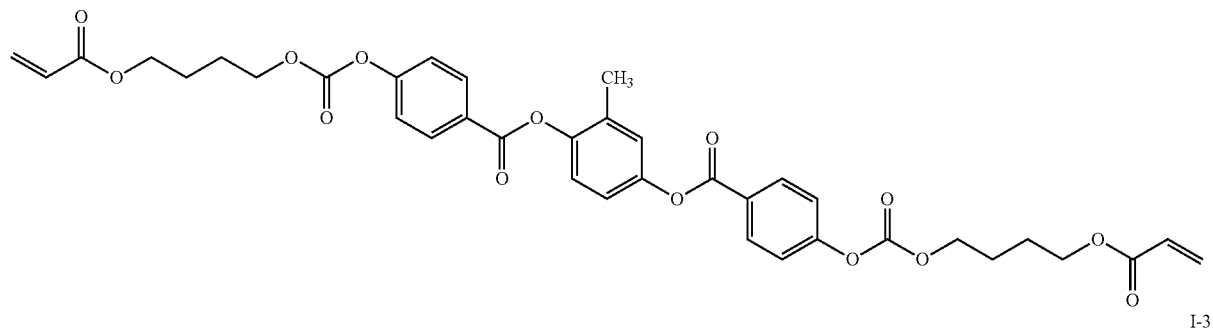
I-3
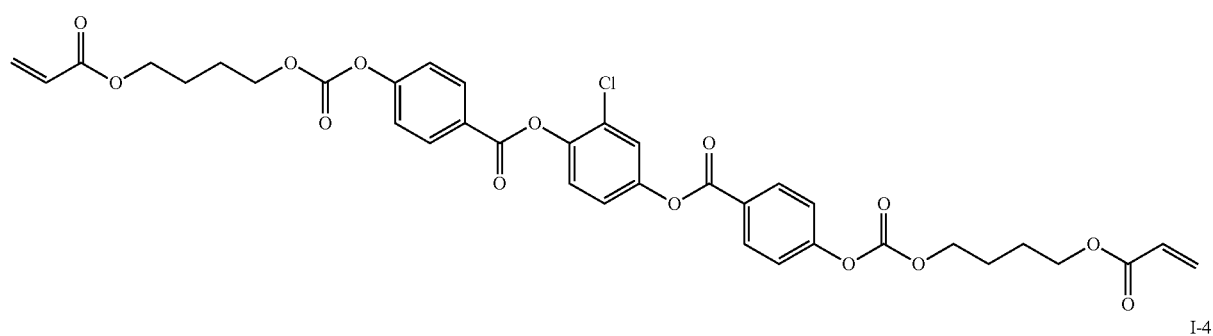
I-4
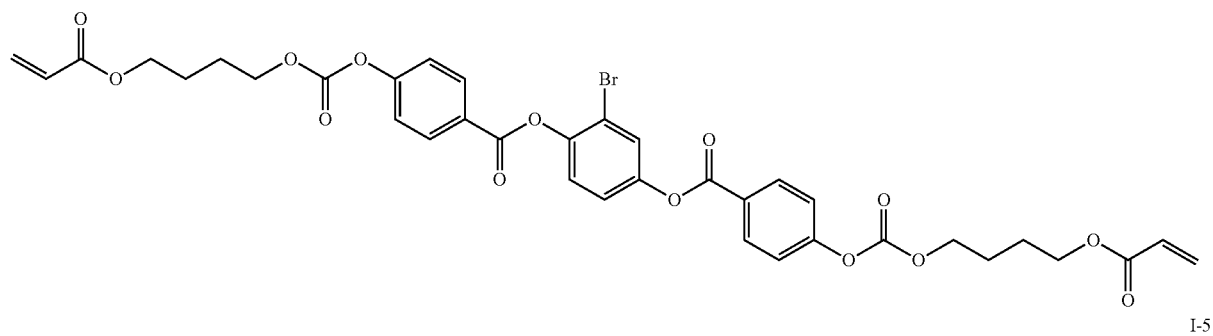
I-5
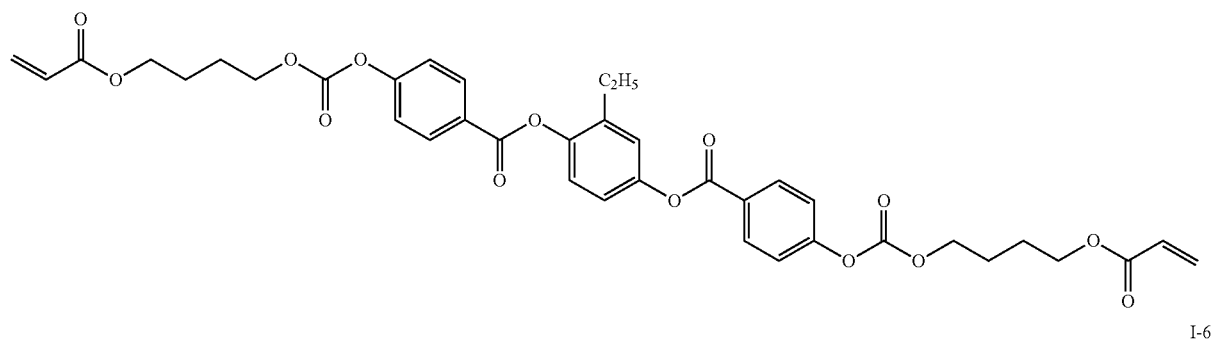
I-6
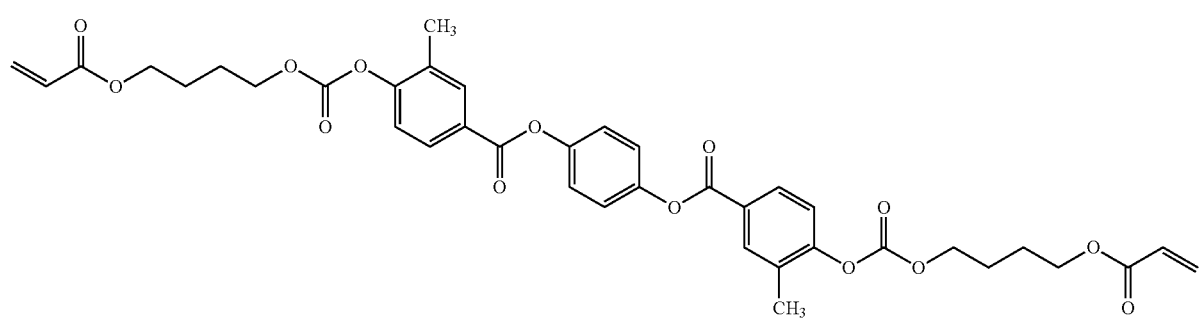

-continued
I-7
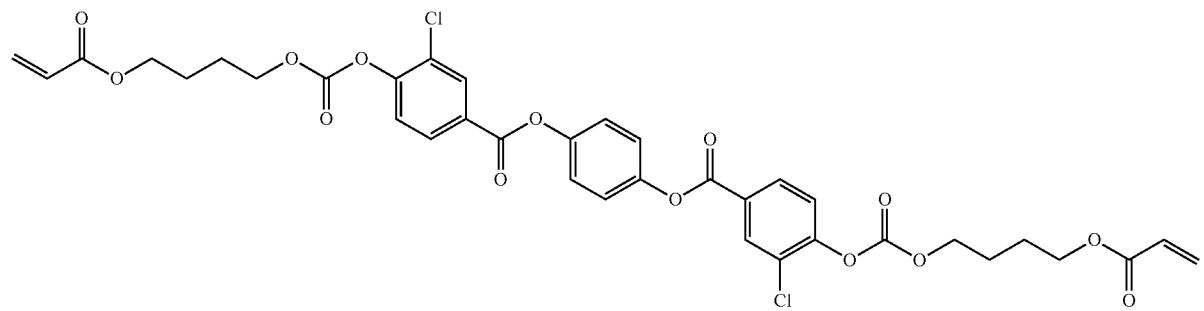
I-8
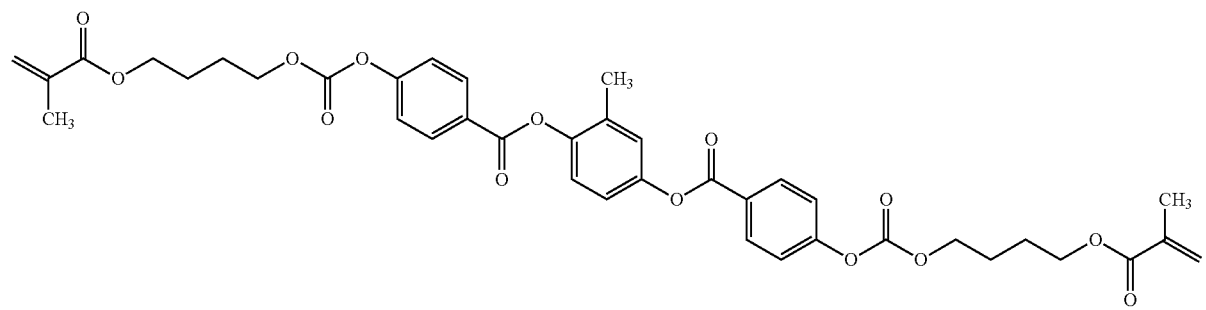
I-9
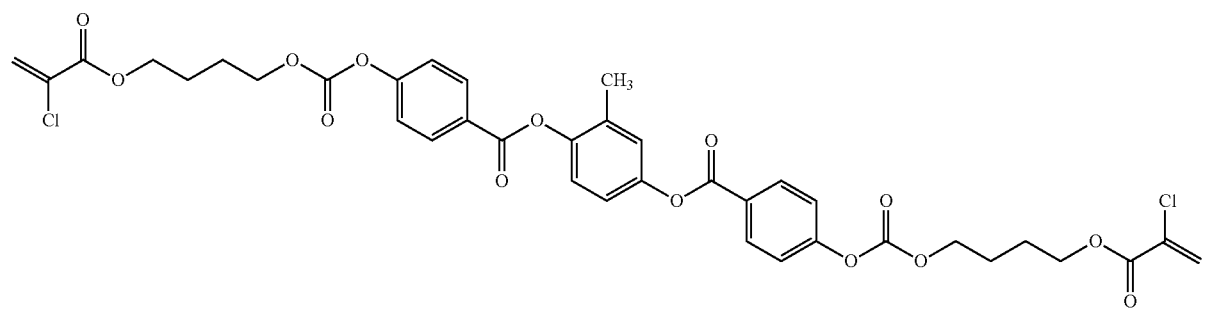
I-10
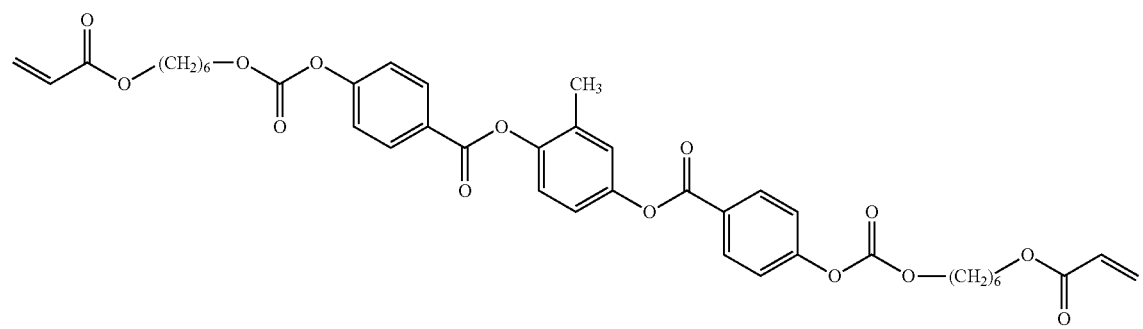

-continued
I-11
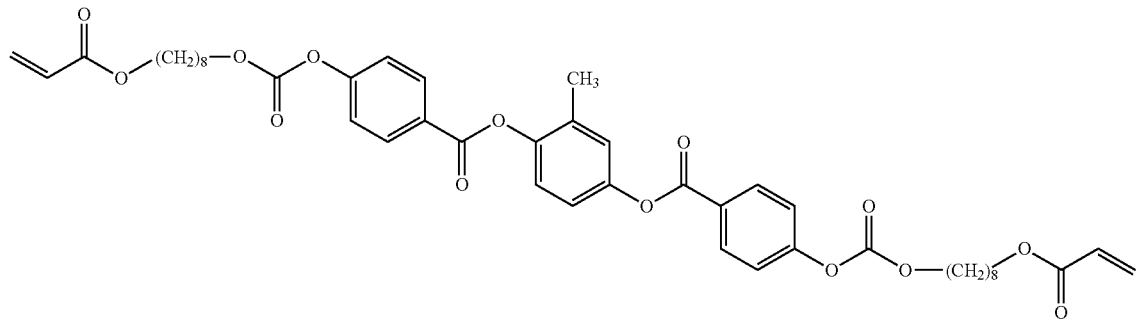
I-12
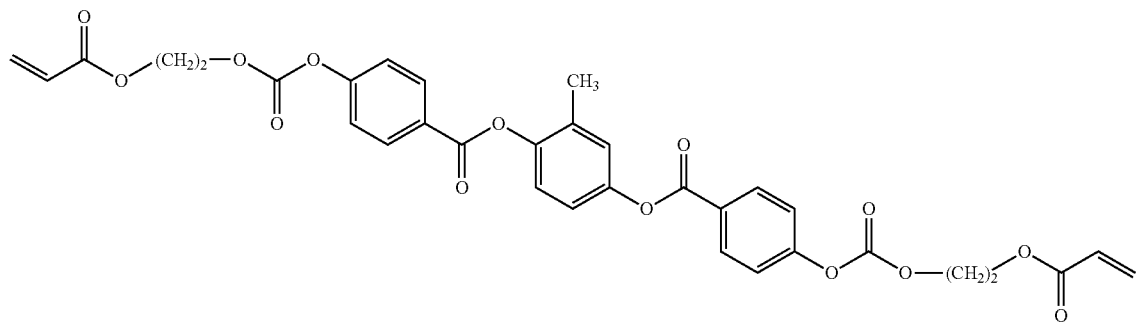
I-13
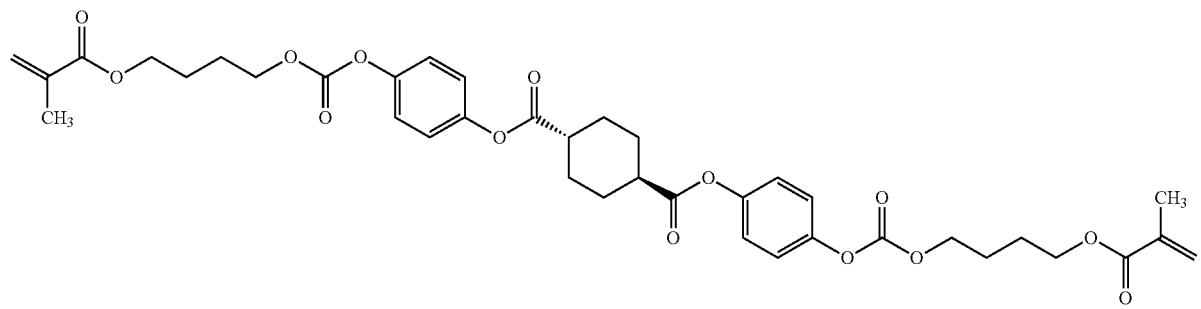
I-14
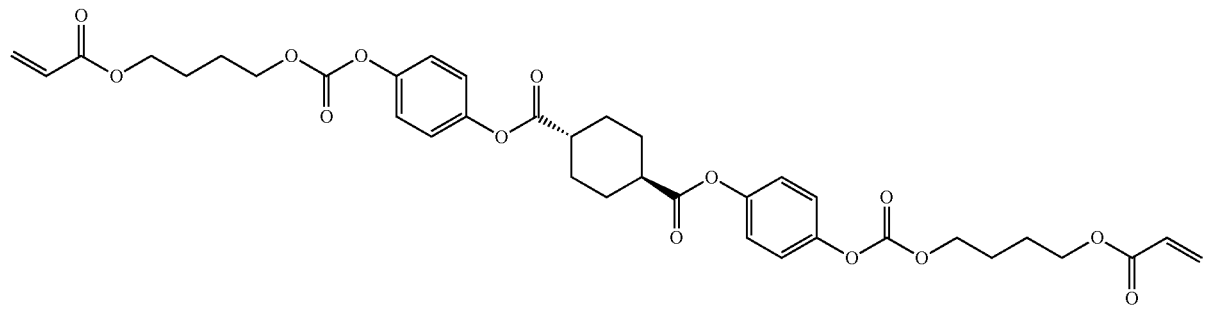

I-15
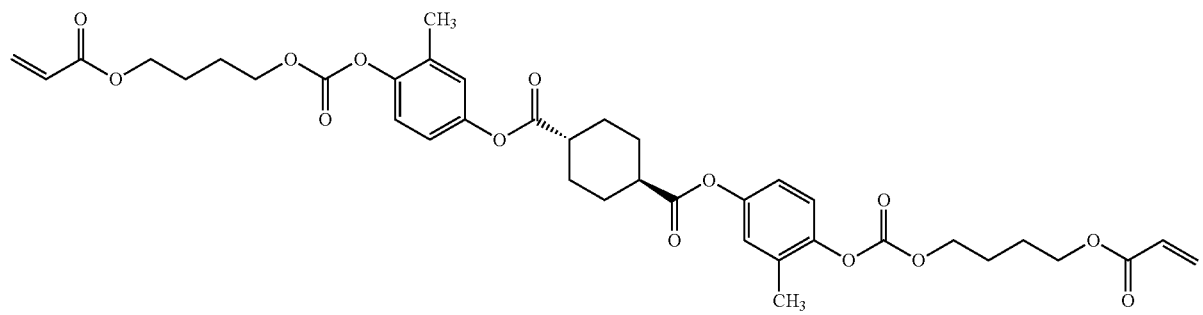
I-16
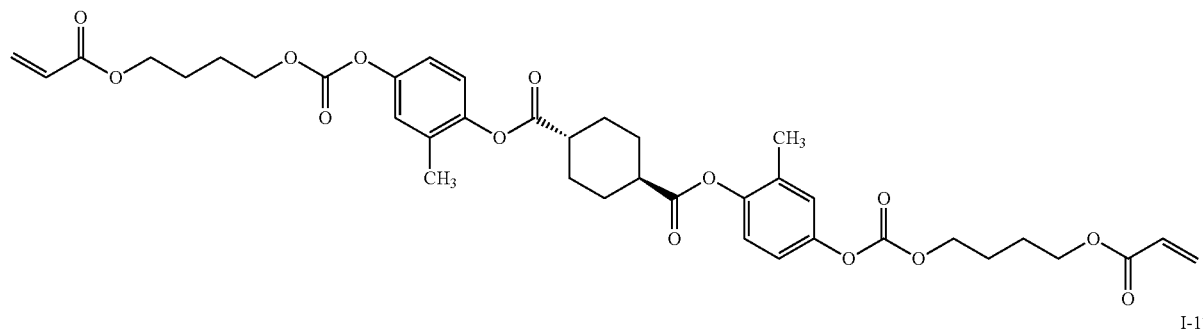
I-17
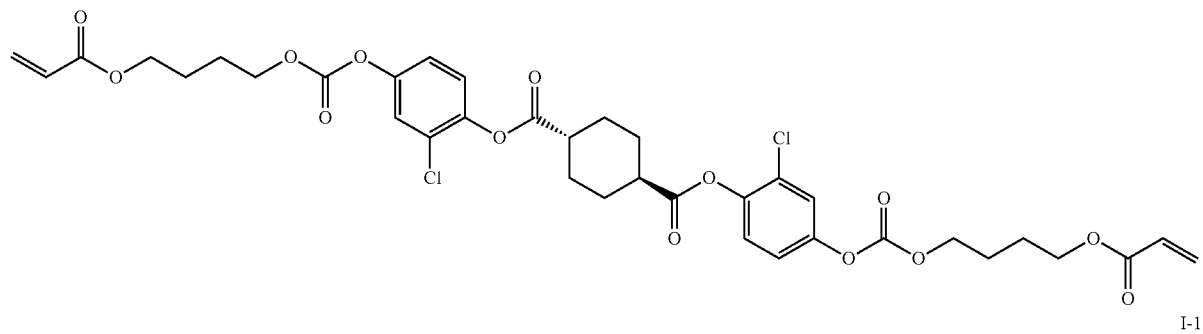
I-18
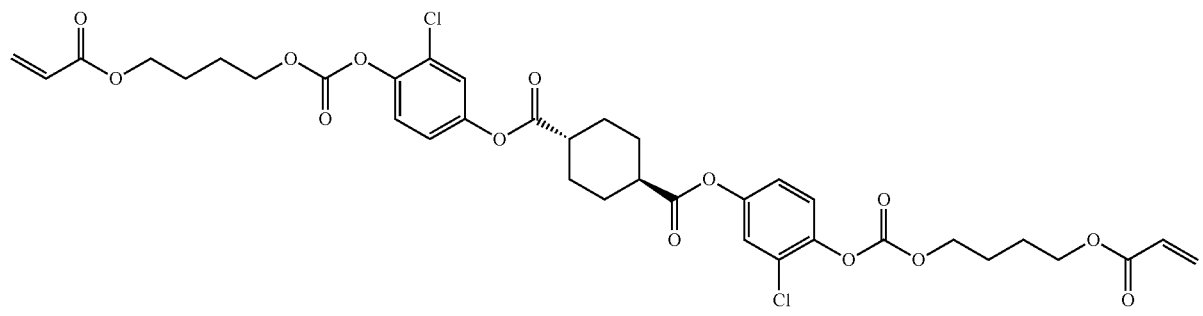
I-19
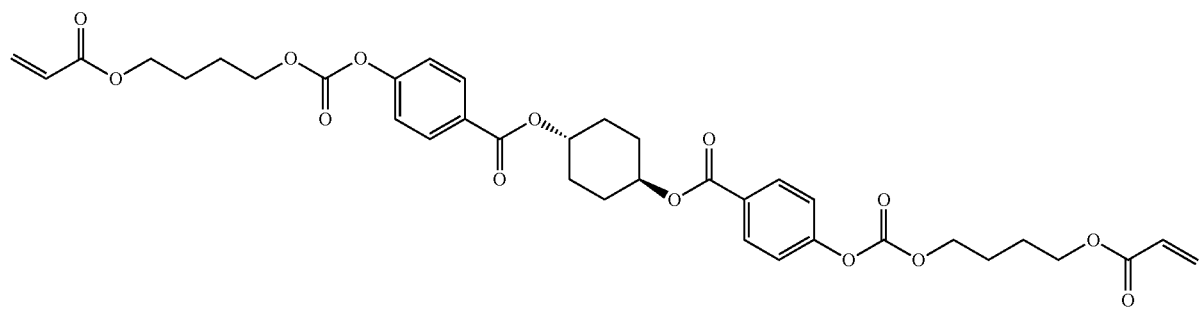

-continued
I-20
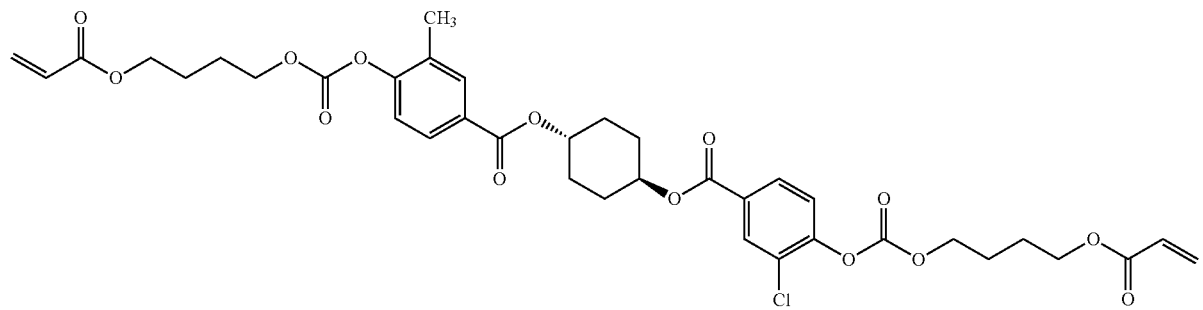
I-21
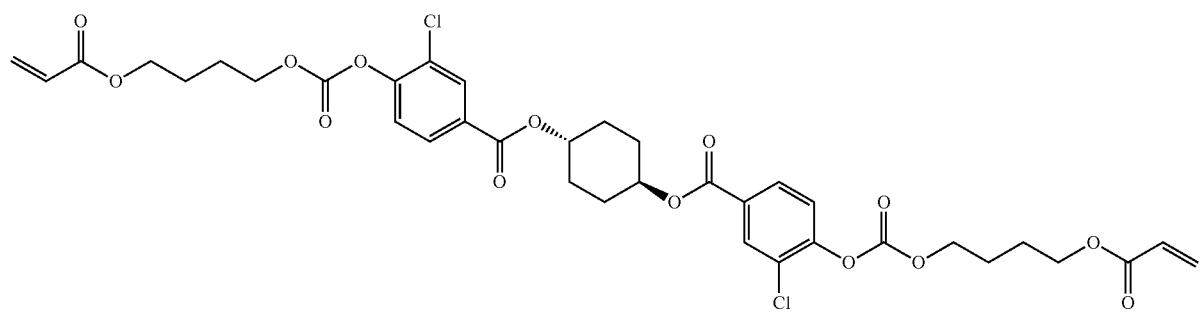
I-22
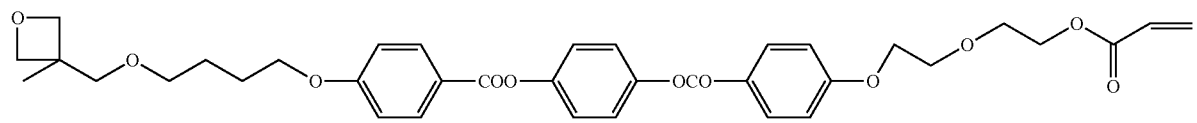
I-23
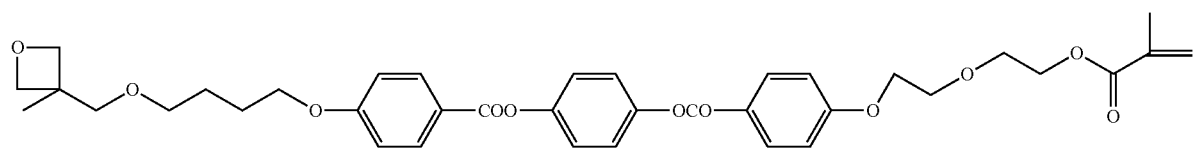
I-24
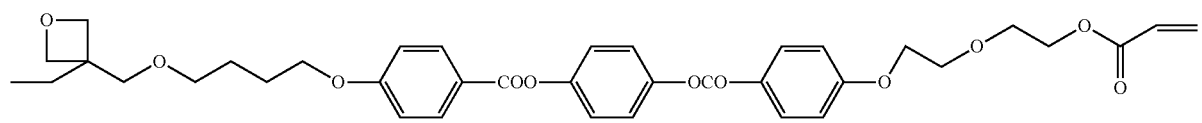
I-25
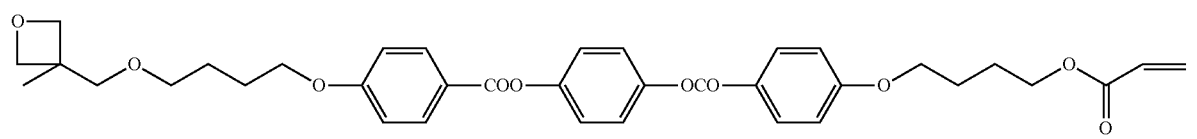
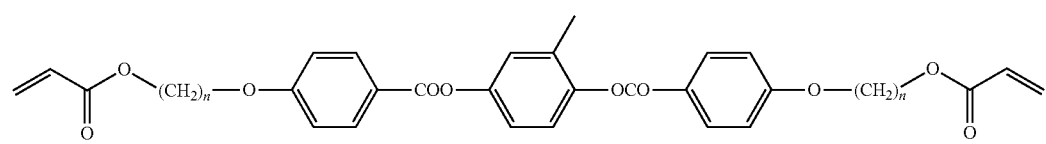
I-26: n = 3
I-27: n = 4
I-28: n = 6

In general, the retardation of a rod-like liquid crystal decreases with an increase in wavelength. With a liquid crystal showing a retardation of 137.5 nm of λ/4 at a wavelength of G (550 nm), the retardation is lower than this value at a wavelength of R (600 nm) and is higher than it at a wavelength of B (450 nm). In order to solve this problem, the retardation layers used in the first and second embodiments are preferably composed of a rod-like liquid crystal satisfying a requirement: Δnd (450 nm)<Δnd (550 nm)<Δnd (650 nm), i.e., a rod-like liquid crystal in which the retardation shows reverse dispersion characteristics with respect to wavelength (increases in retardation with wavelength) in the visible light region. Examples of such a rod-like liquid crystal include compounds represented by Formulae (I) and (II) in JP-A-2007-279688.

The rod-like liquid crystal is preferably horizontally aligned in use. The term "horizontal alignment" in the specification means that the molecular major axis and the layer surface of a rod-like liquid crystal are parallel to each other. Herein, it is not required to be strictly parallel. In the specification, the term "parallel" refers to an alignment where a tilt angle from a horizontal plane is less than 10°. The tilt angle is preferably 0° to 5°, more preferably 0° to 3°, more preferably 0° to 2°, and most preferably 0° to 1°.

The composition may contain an additive that enhances the horizontal alignment of the liquid crystal. Examples of the additive include the compounds described in paragraphs [0055] to [0063] of JP-A-2009-223001.

[Discotic Liquid Crystal Compound Having at Least One Polymerizable Group]

The discotic liquid crystal which can be used in the present invention as a main ingredient of the optically-anisotropic layer is preferably selected from the discotic liquid crystal compounds having a polymerizable group as describe above.

The discotic liquid crystal is preferably selected from the compounds represented by formula (I).

D(-L-H-Q)$_n$  (I)

In the formula, D represents a disc-like core; L represents a divalent linking group; H represents a divalent aromatic ring or a heterocyclic ring; Q is a group containing a polymerizable group; and n is an integer of from 3 to 12.

The disc-like core (D) is preferably a benzene ring, naphthalene ring, triphenylene ring, anthraquinone ring, truxene ring, pyridine ring, pyrimidine ring, or triazine ring, or especially preferably a benzene ring, triphenylene ring, pyridine ring, pyrimidine ring or triazine ring.

L is preferably selected from the divalent liking group consisting of *—O—CO—, *—CO—O—, *—CH=CH—, *—C≡C— and any combinations thereof, or is especially preferably a divalent linking group containing at least one of *—CH=CH— and *—C≡C—. The symbol of "*" is a site bonding to D of the formula (I).

The aromatic ring represented by H is preferably a benzene ring or a naphthalene ring, or is more preferably a benzene ring. The heterocyclic ring represented by H is preferably a pyridine ring or pyrimidine ring, or is more preferably a pyridine ring. Preferably, H is an aromatic ring.

The polymerization of the polymerizable group in the group Q is an addition polymerization (including ring-opening polymerization) or a condensation polymerization. In other words, the polymerizable group is preferably a functional group capable of addition polymerization or condensation polymerization. Among them, a (meth)acrylate or epoxy group is preferable.

The discotic liquid crystal represented by the formula (I) is preferably selected from the formula (II) or (III).

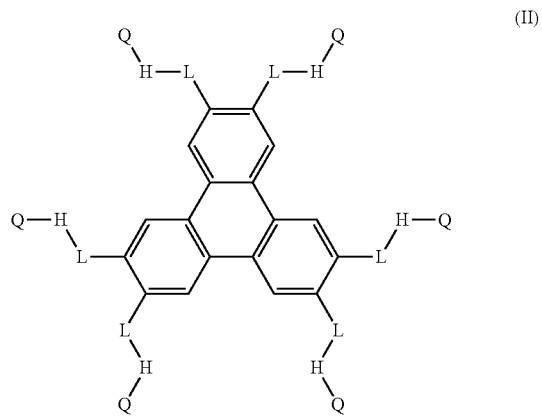

In the formula, the definitions of L, H and Q are same as those of L, H and Q in the formula (I) respectively; and the preferable examples thereof are same as those of L, H and Q in the formula (I) respectively.

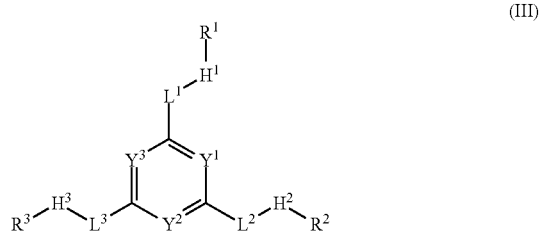

In the formula, the definitions of Y$^1$, Y$^2$ and Y$^3$ are same as those of Y$^{11}$, Y$^{12}$ and Y$^{13}$ in the formula (IV) described later respectively, and the preferable examples thereof are same as those of Y$^{11}$, Y$^{12}$ and Y$^{13}$ in the formula (IV) respectively. Or the definitions of L$^1$, L$^2$, L$^3$, H$^1$, H$^2$, H$^3$, R$^1$, R$^2$ and R$^3$ are same as those of L$^1$, L$^2$, L$^3$, H$^1$, H$^2$, H$^3$, R$^1$, R$^2$ and R$^3$ in the formula (IV) described later respectively, and the preferable examples thereof are same as those of L$^1$, L$^2$, L$^3$, H$^1$, H$^2$, H$^3$, R$^1$, R$^2$ and R$^3$ in the formula (IV) described later respectively.

As described later, the discotic liquid crystal having plural aromatic rings such as the compounds represented by formula (I), (II) or (III) may interact with the onium salt such as pyridium or imidazolium compound to be used as an alignment controlling agent by the π-π molecular interaction, thereby to achieve the vertical alignment. Especially, for example, the compound represented by the formula (II) in which L represents a divalent linking group containing at least one selected from *—CH=CH— and *—C≡C—, or the compound represented by formula (III) in which plural aromatic rings or heterocyclic rings are connected via a single bond to each other may keep the linearity of the molecule thereof since the free rotation of the bonding may be restricted strongly by the linking group. Therefore, the liquid crystallinity of the compound may be improved and the compound may achieve the more stable vertical alignment by the stronger intermolecular π-π interaction.

The discotic liquid crystal is preferably selected from the compounds represented by formula (IV)

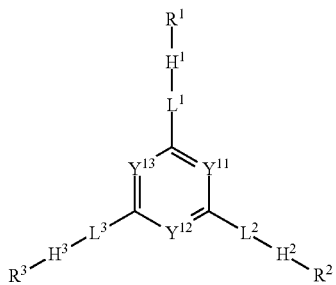
(IV)

In the formula, $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent the following formula (I-A) or (I-B); $R^1$, $R^2$ and $R^3$ each independently represent the following formula (I-R);

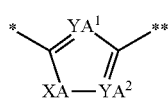
(I-A)

in formula (I-A), $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$;

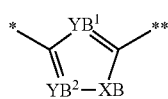
(I-B)

in formula (I-B), $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$;

$$*\text{-}(\text{-}L^{21}\text{-}Q^2)_{n1}\text{-}L^{22}\text{-}L^{23}\text{-}Q^1 \quad (\text{I-R})$$

in formula (I-R), * indicates the position at which the formula bonds to $H^1$, $H^2$ or $H^3$ in formula (IV); $L^{21}$ represents a single bond or a bivalent linking group; $Q^2$ represents a bivalent cyclic linking group having at least one cyclic structure; n1 indicates an integer of from 0 to 4; $L^{22}$ represents —O—, —O—CO—, —CO—O—, —O—CO—O—, —S—, —NH—, —SO$_2$—, —CH$_2$—, —CH═CH— or —C≡C—; $L^{23}$ represents a bivalent linking group selected from —O—, —S—, —C(═O)—, —SO$_2$—, —NH—, —CH$_2$—, —CH═CH— and —C≡C—, and a group formed by linking two or more of these; and $Q^1$ represents a polymerizable group or a hydrogen atom.

Preferable ranges of the symbols in formula (IV) and Examples of the three-substituted benzene base discotic liquid crystal compound represented by formula (IV) are described in JP-A-2010-244038, [0013]-[0077], and the same may be applied to the invention. However, the discotic liquid crystal compound to be used in the invention is not limited to the compound represented by formula (IV).

Examples of the triphenylene compound which can be used in the invention include, but are not limited to, those described in JP-A-2007-108732, [0062]-[0067].

The discotic liquid crystal represented by formula (IV) having plural aromatic rings may interact with the pyridinium or imidazolium compound described later via the intermolecular π-π interaction, which may increase the tilt angle of the discotic liquid crystal in the area neighboring to the alignment film. Especially, the discotic liquid crystal represented by formula (IV) in which plural aromatic rings or heterocyclic rings are connected via a single bond to each other may keep the linearity of the molecule thereof since the free rotation of the bonding may be restricted strongly by the linking group. Therefore, the discotic liquid crystal represented by formula (IV) having plural aromatic rings may interact with the pyridinium or imidazolium compound via the stronger intermolecular π-π interaction, which may increase the tilt angle of the discotic liquid crystal more remarkably in the area neighboring to the alignment film to achieve the vertical alignment.

According to the invention, it is preferable that the discotic liquid crystal is aligned vertically. It is to be understood that the term "vertical alignment" in the specification means that the discotic plane of the discotic liquid crystal is vertical to the layer plane, wherein strict verticalness is not always necessary; and means, in this specification, that a tilt angle of liquid crystalline molecules with respect to the horizontal plane is equal to or larger than 70°. The tilt angle is preferably from 85 to 90°, more preferably from 87 to 90°, even more preferably from 88 to 90°, or most preferably from 89 to 90°.

The composition preferably contains any additive(s) capable of promoting the vertical alignment, and examples of the additive include those described in JP-A-2009-223001, [0055]-[0063].

[Onium Salt Compound (Agent for Controlling Alignment at Alignment Film)]

According to the present invention, any onium salt compound is preferably added for achieving the vertical alignment of the liquid crystal compound having the polymerizable group, or especially, the discotic liquid crystal having the polymerizable group. The onium salt may localize at the alignment film interface, and may function to increase the tilt angles of the liquid crystal molecules in the area neighboring to the alignment film As the onium salt compound, the compound represented by formula (1) is preferable.

$$Z\text{—}(Y\text{-}L\text{-})_n Cy^+ . X^- \quad \text{Formula (1)}$$

In the formula, Cy represents a 5-membered or 6-membered cyclic onium group; the definitions of L, Y, Z and X are same as those of $L^{23}$, $L^{24}$, $Y^{22}$, $Y^{23}$, $Z^{21}$ and X in formula (2a) or (2b) described later, and these preferable examples are same as those of them in formula (2a) or (2b); and n represents an integer of equal to or more than 2.

The 5-membered or 6-membered onium group (Cy) is preferably pyrazolium ring, imidazolium ring, triazolium ring, tetrazolium ring, pyridium ring, pyrimidinium ring or triazinium ring, or more preferably imidazolium ring or pyridinium ring.

The 5- or 6-membered onium group (Cy) preferably has a group affinity with the material of the alignment film. Preferably, the onium salt compound exhibits the high affinity with the material of the alignment film at a temperature of $T_1$ degrees Celsius, and the onium salt compound exhibits the low affinity with the material of the alignment film at a temperature of $T_2$ degrees Celsius. The hydrogen bonding can become both of the bonding state and the non-bonding state within the temperature range (room temperature to 150 degrees Celsius) within which the liquid crystal may be aligned, and therefore, the affinity due to the hydrogen bonding is preferably used. However, the invention is not limited to the embodiment using the affinity due to the hydrogen bonding.

For example, according to the embodiment employing the polyvinyl alcohol as a material of the alignment film, the onium salt preferably has the group which is capable of forming the hydrogen bonding to form the hydrogen bonding with a hydroxy group of the polyvinyl alcohol. The theoretical interpretation of the hydrogen bonding is reported, for example, in Journal of American Chemical Society, vol. 99, pp. 1316-1332, 1977, H. Uneyama and K. Morokuma. The concrete modes of the hydrogen bonding are exemplified in FIG. 17 on page 98 described in "Intermolecular and Surface Forces (Bunshikanryoku to Hyoumenn Chohryoku)" written by Jacob Nissim Israelachvili, translated in Japanese by Tamotsu Kondoh and Hiroyuki Ohshima, and published by McGraw-Hill Company in 1991. Examples of the hydrogen bonding include those described in Angewante Chemistry International Edition English, col. 34, 00.2311, 1955, G. R. Desiraju.

The 5-membered or 6-membered cyclic onium group having a hydrogen bonding group may increase the localization at the alignment film interface and promote the orthogonal alignment with respect to the main chain of the polyvinyl alcohol by the hydrogen bonding with the polyvinyl alcohol along with the affinity effect of the onium group. Preferable examples of the hydrogen bonding group include an amino group, carbamide group, sulfonamide group, acid amide group, ureido group, carbamoyl group, carboxyl group, sulfo group, nitrogen-containing heterocyclic group (such as imidazolyl group, benzimidazolyl group pyrazolyl group, pyridyl group, 1,3,5-triazyl group, pyrimidyl group, pyridazyl group, quinonyl group, benzoimidazolyl group, benzothiazolyl, succinimide group, phthalimide group, maleimide group, uracil group, thiouracil group, barbituric acid group, hydantoin group, maleic hydrazide group, isatin group, and uramil group). More preferable examples of the hydrogen bonding include an amino group and pyridyl group.

For example, as well as an imidazolium ring in which a nitrogen atom having a group capable of forming the hydrogen bonding is embedded, the 5-membered or 6-membered onium ring in which any atom(s) having a group capable of forming the hydrogen bonding is embedded is also preferable In the formula, n is preferably an integer of from 2 to 5, more preferably 3 or 4, or most preferably 3. Plural L and Y may be same or different from each other respectively. The onium salt represented by formula (1) in which n is not smaller than 3 has 3 or more numbers of the 5-membered or 6-membered rings, may interact with the discotic liquid crystal by the intermolecular π-π interaction, and, especially on the polyvinyl-alcohol alignment film, can achieve the orthogonal-vertical alignment with respect to the polyvinyl-alcohol main chain.

The onium salt represented by formula (1) is preferably selected from the pyridinium compounds represented by formula (2a) or the imidazolium compounds represented by formula (2b).

The compound represented by formula (2a) or (2b) may mainly be added to the discotic liquid crystal represented by any one of the formulas (I)-(IV) for controlling the alignment of the liquid crystal compound at the alignment film interface, and may have a function of increasing the tilt angles of the discotic liquid crystal molecules in the area neighboring to the alignment film interface.

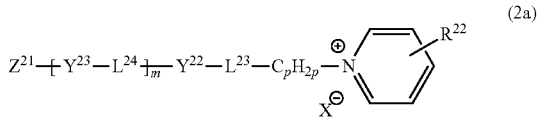

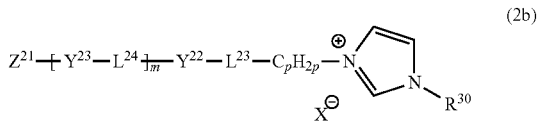

In the formula, $L^{23}$ and $L^{24}$ represent a divalent linking group respectively.

$L^{23}$ is preferably a single bond, —O—, —O—CO—, —CO—O—, —C≡C—, —CH=CH—, —CH=N—, —N=CH—, —N=N—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—, and AL is a $C_{1-10}$ alkylene group. $L^{23}$ is more preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—, even more preferably a single bond or —O—, or most preferably —O—.

$L^{24}$ is preferably a single bond, —O—, —O—CO—, —CO—O—, —C≡C—, —CH=CH—, —CH=N—, —N=CH— or —N=N—, or more preferably —O—CO— or —CO—O—. If n is equal to or larger than 2, a plurality of $L^{24}$ preferably represents —O—CO— or —CO—O— alternately.

$R^{22}$ represents a hydrogen atom, unsubstituted amino group or substituted $C_{1-20}$ amino group.

If $R^{22}$ is a dialkyl-substituted amino group, the two alkyls may connect to each other to form a nitrogen-containing heterocyclic ring. The nitrogen-containing heterocyclic ring is preferably a 5-membered or 6-membered ring. $R^{22}$ preferably represents a hydrogen atom, non-substituted amino group or $C_{2-12}$ dialkyl substituted amino group, or even more preferably, a hydrogen atom, non-substituted amino group or $C_{2-8}$ dialkyl substituted amino group. If $R^{22}$ is a non-substituted or substituted amino group, the 4-position of the pyridinium is preferably substituted.

X represents an anion.

X preferably represents a monovalent anion. Examples of the anion include halide ion (such as fluorine ion, chlorine ion, bromine ion and iodide ion) and sulfonic acid ions (such as methane sulfonate ion, p-toluene sulfonate ion and benzene sulfonate ion).

$Y^{22}$ and $Y^{23}$ represent a divalent linking group having a 5-membered or 6-membered ring as a part structure respectively.

The 5-membered or 6-membered ring may have at least one substituent. Preferably, at least one of $Y^{22}$ and $Y^{23}$ is a divalent linking group having a 5-membered or 6-membered ring with at least one substituent as a part structure. Preferably, $Y^{22}$ and $Y^{23}$ each independently represent a divalent linking group having a 6-membered ring, which may have at least one substituent, as a part structure. The 6-membered ring includes an alicyclic ring, aromatic ring (benzene ring) and heterocyclic ring. Examples of the 6-membered alicyclic ring include a cyclohexane ring, cyclohexane ring and cyclohexadiene ring. Examples of the 6-membered heterocyclic ring include pyrane ring, dioxane ring, dithiane ring, thiin ring, pyridine ring, piperidine ring, oxazine ring, morpholino ring, triazine ring, pyridazine ring, pyrimidine ring, pyrazine ring, piperazine ring and triazine ring. Other 6-membered or 5-membered ring(s) may be condensed with the 6-membered ring.

Examples of the substituent include halogen atoms, cyano, $C_{1-12}$ alkyls and $C_{1-12}$ alkoxys. The alkyl or alkoxy may have at least one $C_{2-12}$ acyl or $C_{2-12}$ acyloxy. The substituent is preferably selected from $C_{1-12}$ (more preferably $C_{1-6}$, even more preferably $C_{1-3}$) alkyls. The 5-membered or 6-membered ring may have two or more substituents. For example, if $Y^{22}$ and $Y^{23}$ are phenyls, they may have from 1 to 4 $C_{1-12}$ (more preferably $C_{1-6}$, or even more preferably $C_{1-3}$) alkyls.

In the formula, m is 1 or 2, or is preferably 2. If m is 2, plural $Y^{23}$ and $L^{24}$ may be same or different from each other respectively.

In the formula, $Z^{21}$ is a monovalent group selected from the group consisting of a halogen-substituted phenyl, nitro-substituted phenyl, cyano-substituted phenyl, $C_{1-10}$ alkyl-substituted phenyl, $C_{2-10}$ alkoxy-substituted phenyl, $C_{1-12}$ alkyl, $C_{2-20}$ alkynyl, $C_{1-12}$ alkoxy, $C_{2-13}$ alkoxycarbonyl, $C_{7-26}$ aryloxycarbonyl and $C_{7-26}$ arylcarbonyloxy.

If m is 2, $Z^{21}$ is preferably cyano, a $C_{1-10}$ alkyl or a $C_{1-10}$ alkoxy, or more preferably a $C_{4-10}$ alkoxy.

If m is 1, $Z^{21}$ is preferably a $C_{7-12}$ alkyl, $C_{7-12}$ alkoxy, $C_{7-12}$ acyl-substituted alkyl, $C_{7-12}$ acyl-substituted alkoxy, $C_{7-12}$ acyloxy-substituted alkyl or $C_{7-12}$ acyloxy-substituted alkoxy.

The acyl is represented by —CO—R, the acyloxy is represented by —O—CO—R, and R represents an aliphatic group (including alkyl, substituted alkyl, alkenyl, substituted alkenyl, alkynyl and substituted alkynyl), or an aromatic group (including aryl and substituted aryl). R is preferably an aliphatic group, or more preferably an alkyl or alkenyl.

In the formula, p is an integer of from 1 to 10, or preferably 1 or 2. $C_pH_{2p}$ represents an alkylene chain which may have a branched structure. $C_pH_{2p}$ is preferably a linear alkylene chain (—$(CH_2)_p$—).

In formula (2b), $R^{30}$ represents a hydrogen atom or a C1-12 (preferably $C_{1-6}$, or more preferably $C_{1-3}$) alkyl group.

Among the compounds represented by formula (2a) or (2b), the compound represented by formula (2a') or (2') is preferable.

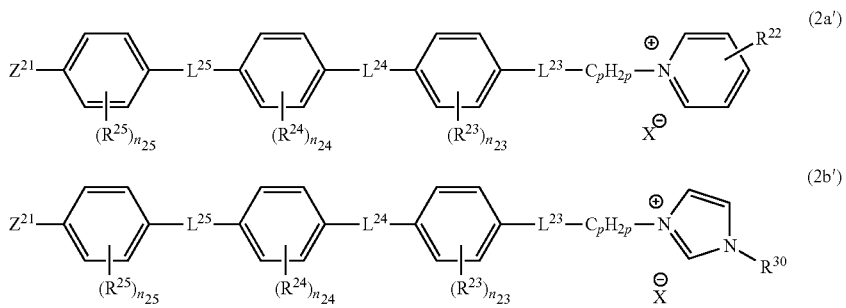

Among the symbols in the formula (2a') or (2b'), the same symbols have the same definition as those found in formula (2), and preferable examples thereof are same as those in formula (2). Preferably, $L^{24}$ and $L^{25}$ represent —O—CO— or —CO—O—; or more preferably, $L^{24}$ is —O—CO— and $L^{25}$ is —CO—O—.

$R^{23}$, $R^{24}$ and $R^{25}$ represent a $C_{1-12}$ (more preferably $C_{1-6}$, or even more preferably $C_{1-3}$) alkyl respectively. In the formula, $n_{23}$ is from 0 to 4, $n_{24}$ is from 1 to 4, and $n_{25}$ is from 0 to 4. Preferably, $n_{23}$ and $n_{25}$ are 0, and $n_{24}$ is from 1 to 4 (more preferably from 1 to 3).

Preferably, $R^{30}$ represents a $C_{1-12}$ (more preferably $C_{1-6}$, or even more preferably $C_{1-3}$) alkyl.

Examples of the compound represented by formula (1) include those described in JP-A-2006-113500, columns [0058]-[0061].

Specific examples of the compound represented by formula (1) include, but are not limited to, those shown below.

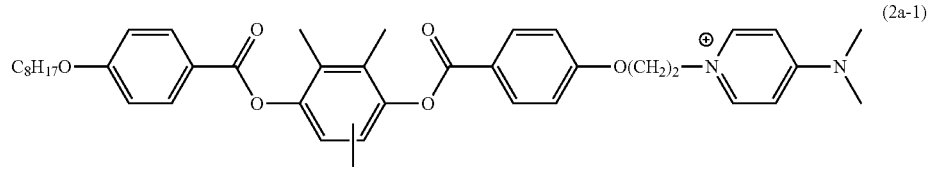

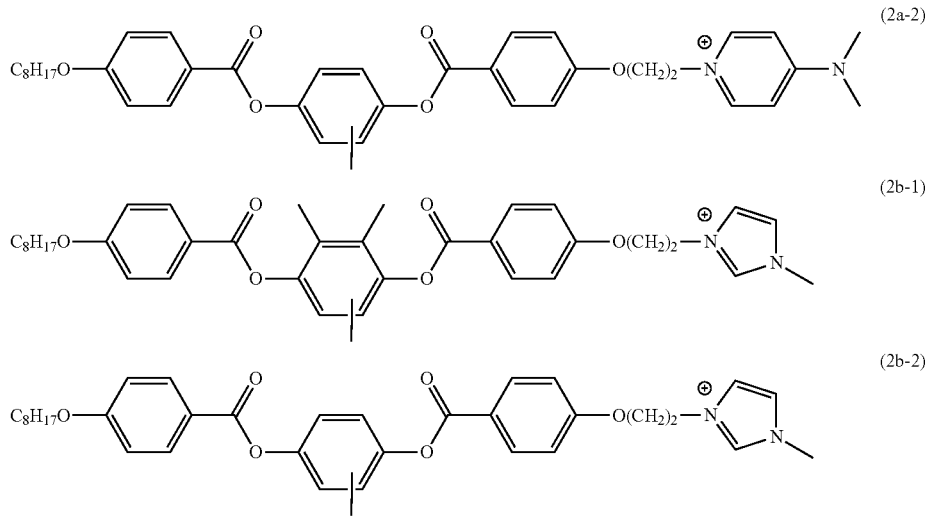

The compound represented by formula (2a) or (2b) may be prepared according to a usual method. For example, usually, the pyridinium derivative may be prepared according to the method wherein a pyridine ring is subjected to an alkylation (Menschutkin reaction).

An amount of the onium salt may be not more than 5% by mass, or preferably about 0.1 to about 2% by mass, with respect to an amount of the liquid crystal compound.

The onium salt represented by formula (2a) or (2b) may localize at the surface of the hydrophilic polyvinyl alcohol alignment film since the pyridinium or imidazolium group is hydrophilic. Especially, the pyridinium group, or the pyridinium group, having an amino which is an acceptor of a hydrogen atom (in formula (2a) or (2a'), $R^{22}$ is a non-substituted amino or $C_{1-20}$ substituted amino), may form an intermolecular hydrogen bonding with the polyvinyl alcohol, may localize at the surface of the alignment film densely, and may promote the orthogonal alignment of the liquid crystal with respect to the rubbing direction along with the pyridinium derivative, which is aligned along the direction orthogonal to the polyvinyl alcohol main chain, by the effect of the hydrogen bonding. The pyridinium derivative having plural aromatic rings may interact with the liquid crystal, especially discotic liquid crystal, by the strong intermolecular π-π interaction, and may induce the orthogonal alignment of the discotic liquid crystal in the area neighboring to the alignment film. Especially, as represented by formula (2a'), the compound in which the hydrophilic pyridinium group is connected with the hydrophobic aromatic ring may have an effect of inducing the vertical alignment by the hydrophobic property.

Furthermore, in the embodiment using also the onium salt represented by formula (2a) or (2b), the horizontal alignment state in which the liquid crystal is aligned so that the slow axis thereof is parallel to the rubbing direction may be promoted when being applied with heat over a certain temperature. This may be because the hydrogen bonding with the polyvinyl alcohol would be broken by the thermal energy caused by heating, the onium salt would be dispersed uniformly, the density of the onium salt at the surface of the alignment film would be lowered, and the liquid crystal would be aligned by the alignment controlling force of the rubbed alignment film itself

[Fluoroaliphatic Group-Containing Copolymer (Agent for Controlling Alignment at Air-Interface)]

The fluoroaliphatic group-containing copolymer may be added to the liquid crystal for controlling the alignment of the discotic liquid crystal represented by formula (I) at the air-interface, and may have a function of increasing the tilt angles of the liquid crystal molecules in the area neighboring to the air interface. And the copolymer may also have a function of improving the coating properties such as unevenness or repelling.

Examples of the fluoroaliphatic group-containing copolymer which can be used in the present invention include those described in JP-A-2004-333852, JP-A-2004-333861, JP-A-2005-134884, JP-A-2005-179636, and JP-A-2005-181977. The polymers having a fluoroaliphatic group and at least a hydrophilic group selected from the group consisting of carboxyl (—COOH), sulfo (—SO$_3$H), phosphonoxy {—OP(═O)(OH)$_2$}} and any salts thereof, described in JP-A-2005-179636 and JP-A-2005-181977 are preferable.

An amount of the fluoroaliphatic group-containing copolymer is less than 2% by mass, or preferably from 0.1 to 1% by mass with respect to an amount of the liquid crystal compound.

The fluoroaliphatic group-containing copolymer may localize at the air-interface by the hydrophobic effect of the fluoroaliphatic group, and may provide the low-surface energy area at the air-interface, and the tilt angle of the liquid crystal compound, especially discotic liquid crystal compound, in the area may be increased. Furthermore, by using the copolymer having the hydrophilic group selected from the group consisting of carboxyl (—COOH), sulfo (—SO$_3$H), phosphonoxy {—OP(═O)(OH)$_2$}} and any salts thereof, the vertical alignment of the liquid crystal may be achieved by the charge repulsion between the anion of the copolymer and the π electrons of the liquid crystal.

[Solvent]

The composition to be used for preparing the optically-anisotropic layer is preferably prepared as a coating liquid. Organic solvents are preferably used as the solvent used for preparing the coating liquid. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halide (e.g., chloroform, dichloromethane), esters (e.g., methyl acetate, butyl acetate), ketones (e.g., acetone, methyl ethyl ketone), and ethers (e.g., tetrahydrofuran, 1,2-dimethoxyethane). Alkyl halides and ketones are preferable. Two or more species of organic solvent can be combined.

[Polymerization Initiator]

The composition (for example coating liquid) containing the liquid crystal having the polymerizable group(s) is aligned in any alignment state, and then, the alignment state is preferably fixed via the polymerization thereof (the 5) step in the above-described process). The fixation is preferably carried out by polymerization reaction between the polymerizable groups introduced into the liquid crystalline compound. Examples of the polymerization reaction include thermal polymerization reaction using a thermal polymerization initiator, and photo-polymerization reaction using a photo-polymerization initiator, wherein photo-polymerization reaction is more preferable. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Laid-Open Patent Publication No. S60-105667 and U.S. Pat. No. 4,239,850), and oxadiazole compounds (those described in U.S. Pat. No. 4,212,970). Examples of the cationic photo-polymerization initiator include organic sulfonium salts, iodonium salts and phosphonium salts, organic solfonium salts are preferable, and triphenyl sulfonium salts are especially preferable. Preferable examples of the counter ion thereof include hexafluoro antimonate and hexafluoro phosphate.

An amount of the photo-polymerization initiator to be used is preferably from 0.01 to 20% by mass, or more preferable from 0.5 to 5% by mass, with respect to the solid content of the coating liquid.

[Sensitizer]

For enhancing the sensitivity, any sensitizer may be used along with the polymerization initiator. Examples of the sensitizer include n-butyl amine, triethyl amine, tri-n-butyl phosphine and thioxanthone. The photo-polymerization initiator may be used in combination with other photo-polymerization initiator(s). An amount of the photo-polymerization initiator is preferably from 0.01 to 20% by mass, or more preferably from 0.5 to 5% by mass, with respect to the solid content of the coating liquid. For carrying out the polymerization of the liquid crystal compound, an irradiation with UV light is preferably performed.

[Other Additives]

The composition may contain any polymerizable non-liquid-crystal monomer(s) along with the polymerizable liquid crystal compound. Preferable examples of the polymerizable monomer include any compounds having vinyl, vinyloxy, acryloyl or methacryloyl. Using any multi-functional monomer, having two or more polymerizable groups, such as ethylene oxide modified trimethylolpropane acrylate may contribute to improving the durability, which is preferable. An amount of the non-liquid-crystal polymerizable monomer to be used is preferably less than 40% by mass, or more preferably from 0 to 20% by mass, with respect to the amount of the liquid crystal compound.

The thickness of the optically-anisotropic layer is not limited, and preferably from 0.1 to 10 micro meters, or more preferably from 0.5 to 5 micro meters.

[Alignment Film]

Between the optically-anisotropic layer and the transparent support, an alignment film capable of realizing the intended, patterned optically-anisotropic layer may be formed. As the alignment film, preferred is use of a rubbed alignment film.

The "rubbed alignment film" usable in the invention means a layer processed by rubbing so as to have the ability to control the alignment of liquid-crystal molecules. The rubbed alignment film has an alignment axis of controlling the alignment of liquid-crystal molecules; and according to the alignment axis, liquid-crystal molecules are aligned. Liquid-crystal molecules are so aligned that the slow axis of the liquid-crystal molecules is parallel to the rubbing direction in the UV-irradiated part of the alignment film, but are so aligned that the slow axis of the liquid-crystal molecules is aligned perpendicularly to the rubbing direction in the non-irradiated part of the film; and for that purpose, the material of the alignment film, the acid generator, the liquid crystal and the alignment-controlling agent are suitably selected.

The rubbed alignment film generally comprises a polymer as the main ingredient thereof. Regarding the polymer material for the alignment film, a large number of substances are described in literature, and a large number of commercial products are available. The polymer material for use in the invention is preferably polyvinyl alcohol or polyimide, and their derivatives. Especially preferred are modified or unmodified polyvinyl alcohols. Polyvinyl alcohols having a different degree of saponification are known. In the invention, preferred is use of those having a degree of saponification of from 85 to 99 or so. Commercial products are usable here, and for example, "PVA103", "PVA203" (by Kuraray) and others are PVAs having the above-mentioned degree of saponification. Regarding the rubbed alignment film, referred to are the modified polyvinyl alcohols described in WO01/88574A1, from page 43, line 24 to page 49, line 8, and Japanese Patent 3907735, paragraphs [0071] to [0095]. Preferably, the thickness of the rubbed alignment film is from 0.01 to 10 micro meters, more preferably from 0.01 to 1 micro meters.

The rubbing treatment may be attained generally by rubbing the surface of a film formed mainly of a polymer, a few times with paper or cloth in a predetermined direction. A general method of rubbing treatment is described, for example, in "Liquid Crystal Handbook" (published by Maruzen, Oct. 30, 2000).

Regarding the method of changing the rubbing density, employable is the method described in "Liquid Crystal Handbook" (published by Maruzen). The rubbing density (L) is quantified by the following (A):

$$L=N1(L+2\pi rn/60v) \quad (A)$$

wherein N means the rubbing frequency, l means the contact length of the rubbing roller, r means the radius of the roller, n is the rotation number of the roller (rpm), and v means the stage moving speed (per second).

For increasing the rubbing density, the rubbing frequency is increased, the contact length of the rubbing roller is prolonged, the radius of the roller is increased, the rotation number of the roller is increased, the stage moving speed is lowered; but on the contrary, for decreasing the rubbing density, the above are reversed.

The relationship between the rubbing density and the pretilt angle of the alignment film is that, when the rubbing density is higher, then the pretilt angle is smaller, but when the rubbing density is lower, then the pretilt angle is larger.

For sticking an alignment film to a long polarizing film of which the absorption axis is in the lengthwise direction thereof, preferably, an alignment film is formed on a long support of polymer film, and then continuously rubbed in the direction at 45° relative to the lengthwise direction, thereby forming the intended rubbed alignment film.

The alignment film may contain at least one photo-acid-generating agent. The photo-acid-generating agent is a compound capable of generating an acid compound through decomposition by photoirradiation with UV rays or the like. When the photo-acid-generating agent generates an acid compound through decomposition by photoirradiation, then the alignment controlling function of the alignment film is thereby changed. The change in the alignment controlling function as referred to herein may be one to be identified as the change in the alignment controlling function of the alignment film alone, or may be one to be identified as the change in the alignment controlling function to be attained by the alignment film and the additives and others contained in the composition for the optically-anisotropic layer to be disposed on the film, or may also be one to be identified as a combination of the above.

When an onium salt is added thereto, a discotic liquid crystal may be aligned in an orthogonal-vertical alignment state. When the acid generated through decomposition and the onium salt undergo anionic exchange, then the locality of the onium salt in the alignment film interface may lower to thereby lower the orthogonal-vertical alignment performance to form a parallel-vertical alignment state. In addition, for example, in case where the alignment film is a polyvinyl alcohol alignment film, the ester moiety thereof may be decomposed by the generated acid and, as a result, the alignment film interface locality of the onium salt may be thereby changed.

The optically-anisotropic layer may be formed in various methods of using an alignment film, and the method for forming the layer is not specifically defined here.

A first embodiment is a method of using multiple functions that have some influences on the alignment control of discotic liquid crystal, and then removing any of those functions through external stimulation (heat treatment, etc.) to thereby make the predetermined alignment controlling function predominant. For example, the discotic liquid crystal may be aligned in a predetermined alignment state under the combined function of the alignment controlling function of the alignment film and the alignment controlling function of the alignment controlling agent(s) which are added to a liquid-crystal composition, and then the alignment state is fixed to form one retardation domain. After that, by being applied with some external stimulation (heat treatment, etc.), any of the functions (for example, the function of the alignment controlling agent) may be lost while the other alignment control function (for example, the function of the alignment film) may become predominant. The other alignment state may be formed and fixed to thereby form the other retardation domain. For example, in the pyridinium compound represented by the above-mentioned formula (2a) or the imidazolium compound represented by the above-mentioned formula (2b), the pyridinium group or the imidazolium group is hydrophilic, and therefore the compound is localized in the surface of the hydrophilic polyvinyl alcohol alignment film. In particular, if the pyridinium group has an amino group (in the formulae (2a) and (2a'), if $R^{22}$ represents the unsubstituted amino group or the substituted amino group having from 1 to 20 carbon atoms) that is the substituent for the acceptor of hydrogen atom, the intermolecular hydrogen bonding may occur between the pyridinium compound and polyvinyl alcohol, therefore the compound may localize in the surface of the alignment film at a higher density, and in addition, owing to the effect of the hydrogen bonding, the pyridinium compound may be aligned along the direction orthogonal to the main chain of polyvinyl alcohol, which may result in promoting the orthogonal alignment of liquid crystal with respect to the rubbing direction. The pyridinium derivative has multiple aromatic rings in the molecule and therefore provides a strong intermolecular π-π interaction with liquid crystal, especially with discotic liquid crystal, thereby inducing orthogonal alignment of discotic liquid crystal in the vicinity of the alignment film interface. In particular, in case where a hydrophilic pyridinium group bonds to the hydrophobic aromatic ring, as in the general formula (2a'), the compound additionally have the effect of inducing vertical alignment owing to the hydrophilic effect of the ring therein. However, when the compound is heated higher than a certain temperature, then the hydrogen bonding may be broken and the density of the pyridinium compound in the surface of the alignment film may lower, and the above-mentioned effect is thereby lost. As a result, the liquid crystal is aligned owing to the controlling force of the rubbed alignment film itself, and the liquid crystal is thereby in a parallel alignment state. The details of the method are described in Japanese Patent Application No. 2010-141346 (JP-A-2012-008170), and the content thereof is incorporated herein by reference.

A second embodiment is an embodiment employing a patterned alignment film. In this embodiment, a patterned alignment film having different alignment controlling capabilities is formed, and a liquid-crystal composition is disposed thereon so that the liquid crystal is aligned on the alignment film. The liquid crystal is controlled for the alignment thereof owing to the different alignment controlling capabilities of the patterned alignment film, therefore attaining different alignment states. By fixing the alignment states, a pattern of first and second retardation domains is formed according to the pattern of the patterned alignment film. The patterned alignment film may be formed according to a printing method, a mask rubbing method of rubbing an alignment film, or a method of using mask exposure for a photo-alignment film. The patterned alignment film may also be formed as follows: First, an alignment film is formed uniformly, and then an additive having an influence on the alignment controlling capability (for example, the above-mentioned onium salt, etc.) is printed on the layer to thereby form the intended patterned alignment film. The printing method is preferred as not requiring any large-scale equipment and capable of forming the intended patterned alignment film. The details of the method are described in Japanese Patent Application No. 2010-173077 (JP-A-2012-032661), and the content thereof is incorporated herein by reference.

In the case of a rod-like liquid crystal, for example, a ¼-wavelength patterned optically-anisotropic layer comprising domains of which slow axes are orthogonal to each other can also be formed by patterning a horizontal alignment film (a film where the major axis of the liquid crystal molecule is aligned in the alignment treatment (e.g., rubbing treatment) direction) and a vertical alignment film (a film where the major axis of the liquid crystal molecule is aligned in the direction orthogonal the alignment treatment (e.g., rubbing treatment) direction), and aligning the polymerizable rod-like liquid crystal thereon. The patterned alignment film comprising the horizontal alignment film and the vertical alignment film can be formed by, for example, uniformly forming one of the horizontal and vertical alignment films through a coating process or any other process, then forming the other film by patterning on the surface of the resulting film through a printing process or any other process, and performing uniform rubbing treatment in the same direction. For example, printing using a rubber flexographic plate can be employed.

Photo-alignment materials for photo-alignment films that can be used in the present invention may be those described in various documents. Preferred examples of the material for the alignment film of the present invention include azo compounds described in JP-A-s. 2006-285197, 2007-76839, 2007-138138, 2007-94071, 2007-121721, 2007-140465, 2007-156439, 2007-133184, and 2009-109831 and Japanese Patent Nos. 3883848 and 4151746; aromatic ester compounds described in JP-A-2002-229039; maleimide and/or alkenyl-substituted nadimide compounds having photo-alignment units described in JP-A-s. 2002-265541 and 2002-317013; photo-crosslinkable silane derivatives described in Japanese Patent Nos. 4205195 and 4205198; and photo-crosslinkable polyimides, polyamides, and esters described in National Publication of International Patent Application Nos. 2003-520878 and 2004-529220 and Japanese Patent No. 4162850. Particularly preferred are azo compounds and photo-crosslinkable polyimides, polyamides, and esters.

The first and second embodiments may be combined. One example is adding a photo-acid-generating agent to the alignment film. In this example, a photo-acid-generating agent is added to the alignment film, and then pattern-exposed to give a domain where the photo-acid-generating agent is decomposed to generate an acid compound and a domain where an acid compound is not generated. In the non-photoirradiated domain, the photo-acid-generating agent is kept almost undecomposed, and in the domain, therefore, the interaction between the alignment film material, the liquid crystal, and the alignment controlling agent optionally added thereto governs the alignment state, whereby the liquid crystal is aligned so that its slow axis is along the direction orthogonal to the rubbing direction. In case where the alignment film is photoirradiated and an acidic compound is thereby generated therein, the above-mentioned interaction is no more predominant, and the rubbing direction for the rubbed alignment film governs the alignment state, whereby the liquid crystal is aligned in parallel alignment so that the slow axis thereof is parallel to the rubbing direction. The photo-acid-generating agent to be used in the alignment film is preferably a water-soluble compound. Examples of the photo-acid-generating agent usable here include the compounds described in Prog. Polym. Sci., Vol. 23, p. 1485 (1998). As the photo-acid-generating agent, especially preferred for use herein are pyridinium salts, iodonium salts and sulfonium salts. The details of the method are described in Japanese Patent Application No. 2010-289360, and the content thereof is incorporated herein by reference.

A third embodiment is a method using a discotic liquid crystal that has polymerizable groups differing from each other in terms of the polymerizability thereof (for example, oxetanyl group and polymerizing ethylenic unsaturated group). In this embodiment, the discotic liquid crystal is aligned in a predetermined alignment state, and then under the condition under which only one polymerizable group could be polymerized, the liquid crystal layer is photoirradiated to give a pre-optically-anisotropic layer. Next, under the condition under which the other polymerizable group could be polymerized (for example, in the presence of a polymerization initiator for initiating the polymerization of the other polymerizable group), the layer is mask-exposed. The alignment state in the exposed area is completely fixed to form one retardation domain having predetermined Re. In the non-exposed domain, the reaction of the other reactive group has gone on, but the other reactive group is kept unreacted. Accordingly, when this is heated at a temperature higher than the isotropic phase temperature and up to the temperature at which the reaction of the other reactive group could go on, then the non-exposed domain is fixed in the isotropic phase state, or that is, its Re is 0 nm.

[Transparent Support]

The polarizing plate of the present invention may comprise a transparent support for supporting the cured layer. The transparent support may be composed of any polymer film. A polymer film having a low Re and a low Rth is preferably used.

The material of a base polymer of the polymer film usable in the invention includes, for example, polycarbonate polymers; polyester polymers such as polyethylene terephthalate, polyethylene naphthalate, etc.; acrylic polymers such as polymethyl methacrylate, etc.; styrenic polymers such as polystyrene, acrylonitrile/styrene copolymer (AS resin), etc. As other examples of the material usable herein, also mentioned are polyolefins such as polyethylene, polypropylene, etc.; polyolefinic polymers such as ethylene/propylene copolymer, etc.; vinyl chloride polymers; amide polymers such as nylon, aromatic polyamides, etc.; imide polymers; sulfone polymers; polyether sulfone polymers; polyether ether ketone polymers; polyphenylene sulfide polymers; vinylidene chloride polymers; vinyl alcohol polymers; vinylbutyral polymers; arylate polymers, polyoxymethylene polymers; epoxy polymers; mixed polymers prepared by mixing the above-mentioned polymers. The polymer film in the invention may be formed as a cured layer of a UV-curable or thermocurable resin such as acrylic, urethane, acrylurethane, epoxy, silicone or the like resins.

As the material for forming the transparent support, also preferred is use of thermoplastic norbornene resins. As the thermoplastic norbornene resins, there are mentioned Nippon Zeon's Zeonex and Zeonoa; JSR's Arton, etc.

As the material for forming the transparent support, also preferred is use cellulose polymer (hereinafter this may be referred to as cellulose acylate) such as typically triacetylcellulose, which has heretofore been used as a transparent protective film for polarizer.

The transparent support preferably has a thickness of 10 to 120 μm, more preferably 20 to 100 μm, and most preferably 30 to 90 μm. A preferred example of the polymer film used as the transparent support is a retardation film having an Re of 0 to 10 nm and an absolute value of Rth of 20 nm or more.

[Polarizer]

The polarizer may be any polarizer usually used. For example, a polarizer of a polyvinyl alcohol film dyed with iodine or a dichroic dye can be used. In the present invention, an iodine polarizer having adsorbed iodine is preferably used, and a polarizer produced through adsorption of iodine to a stretched film of a polyvinyl alcohol is preferably used. The details of the polarizer are described in Japanese Patent Nos. 3724792 and 3962253 and JP-A-s. 2001-305345 and 2008-63527.

[Surface Layer]

The polarizing plate of the present invention may comprise a functional film such as an antireflection layer. In particular, in the present invention, the polarizing plate preferably comprises an antireflection layer composed of a light-scattering layer and a low-refractive-index layer laminated in this order or an antireflection layer composed of a middle-refractive-index layer, a high-refractive-index layer, and a low-refractive-index layer laminated in this order. A base film may be provided for supporting these layers. Examples of the polymer film that can be used as the base film are the same polymer films that can be used as the support for the optically-anisotropic layer. These layers are preferably disposed on the outermost surface. This configuration can effectively prevent flicker caused by reflection of outer light, in particular, in 3D image display. The antireflection layer may further comprise, for example, a hard coat layer, a forward scattering layer, a primer layer, an antistatic layer, an undercoat layer, or a protective layer. Details of each layer constituting the antireflection layer are described in paragraphs [0182] to of JP-A-2007-254699, and preferred characteristics and preferred materials for the antireflection layer that can be used in the present invention are the same as those described therein.

The base film may also function as the transparent support for the optically-anisotropic layer. Examples of the polymer film that can be used as the base film are the same transparent supports that are used for the optically-anisotropic layer, and preferred examples are the same as those of the transparent support.

[Liquid-Crystal Cell]

The liquid-crystal cell for use in the 3D image display device to be used in the 3D image display system of the invention is preferably a VA-mode, OCB-mode, IPS-mode or TN-mode cell, to which, however, the invention is not limited.

In the TN-mode liquid-crystal cell, rod-shaped liquid-crystal molecules are aligned substantially horizontally and are further twisted at from 60 to 120° under the condition of no voltage application thereto. The TN-mode liquid-crystal cell is most used in color TFT liquid-crystal display devices, and is described in many publications.

In the VA-mode liquid-crystal cell, rod-shaped liquid-crystal molecules are aligned substantially vertically under the condition of no voltage application thereto. The VA-mode liquid-crystal cell includes (1) a narrowly-defined VA-mode liquid-crystal cell where rod-shaped liquid-crystal molecules are aligned substantially vertically under the condition of no voltage application thereto but are aligned substantially horizontally under the condition of voltage application thereto (as described in JP-A 2-176625), and in addition thereto, further includes (2) an MVA-mode liquid-crystal cell in which the VA-mode has been multidomained (as described in SID97, Digest of Tech. Papers (preprints) 28 (1997) 845), (3) an n-ASM mode liquid-crystal cell in which rod-shaped liquid-crystal molecules are aligned substantially vertically under the condition of no voltage application thereto and are aligned in a twisted multidomain alignment under the condition of voltage application thereto (as described in preprints of Discussion in Japanese Liquid Crystal Society, 58-59 (1998)), and (4) a SURVIVAL-mode liquid-crystal cell (as announced in LCD International 98). In addition, the liquid-crystal cell may be in any mode of a PVA (patterned vertical alignment)-mode cell, an OP (optical alignment)-mode cell or a PSA (polymer-sustained alignment)-mode cell. The details of these modes are described in JP-A 2006-215326 and JP-T 2008-538819.

In the IPS-mode liquid-crystal cell, rod-shaped liquid-crystal molecules are aligned substantially horizontally to the substrate, and when an electric field parallel to the substrate face is given thereto, the liquid-crystal molecules respond planarly thereto. In the IPS-mode liquid-crystal cell, the panel is in a black display state under the condition of no electric field application thereto, and the transmission axes of the pair of upper and lower polarizers are perpendicular to each other. A method of using an optical compensatory sheet to reduce the light leakage in oblique directions at the time of black level of display to thereby expand the viewing angle is disclosed in JP-A 10-54982, 11-202323, 9-292522, 11-133408, 11-305217, 10-307291, etc.

EXAMPLES

The invention is described in more detail with reference to the following Examples. In the following Examples, the material used, its amount and ratio, the details of the treatment and the treatment process may be suitably modified or changed not overstepping the spirit and the scope of the invention. Accordingly, the invention should not be limitatively interpreted by the Examples mentioned below.

Example 1

(Production of Cured Layer (A))

<Production of Transparent Support A>

The following ingredients were put into a mixing tank and dissolved by stirring under heat, thereby preparing a cellulose acylate solution A.

Formulation of Cellulose Acylate Solution A

| | |
|---|---|
| Cellulose acylate having a degree of substitution of 2.86 | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 parts by mass |
| Methanol (second solvent) | 54 parts by mass |
| 1-Butanol | 11 parts by mass |

The following ingredients were put into a different mixing tank and dissolved by stirring under heat, thereby preparing an additive solution B.

Formulation of Additive Solution B

| | |
|---|---|
| Compound B1 mentioned below (Re reducer) | 40 parts by mass |
| Compound B2 mentioned below (wavelength dispersion characteristics-controlling agent) | 4 parts by mass |
| Methylene chloride (first solvent) | 80 parts by mass |
| Methanol (second solvent) | 20 parts by mass |

Compound B1:

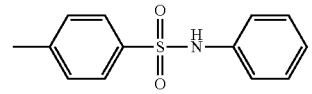 [SMILES: Cc1ccc(S(=O)(=O)Nc2ccccc2)cc1]

Compound B2:

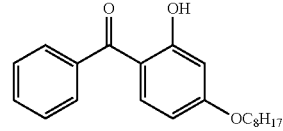

40 parts by mass of the additive solution B was added to 477 parts by mass of the cellulose acylate solution A, and fully stirred to prepare a dope. The dope was cast onto a drum cooled at 0 degrees Celsius, via a casting mouth. When the solvent content therein reached 70% by mass, the formed film was peeled, and both sides in the width direction thereof were fixed with a pin tenter (described in FIG. 3 in JP-A 4-1009). When the solvent content in the film was from 3 to 5% by mass and while the distance of the pin tenter was so controlled that the draw ratio of the film could be 3% in the transverse direction (in the direction transverse to the machine direction), the film was dried. Subsequently, the film was conveyed between rolls of a heat treatment apparatus and was thus further dried, thereby giving a cellulose acetate protective film (transparent support A) having a thickness of 60 micro meters. The transparent support A does not contain a UV absorbent, and Re(550) thereof was 0 nm and Rth(550) thereof was 12.3 nm.

<<Alkali Saponification Treatment>>

The cellulose acetate transparent support A was made to pass through dielectric heating rolls at a temperature of 60 degrees Celsius to thereby elevate the film surface temperature up to 40 degrees Celsius, and then using a bar coater, an alkali solution having the formulation mentioned below was applied onto one surface of the film in a coating amount of 14 ml/m². Then, this was heated at 110 degrees Celsius and conveyed below a steam-type far IR heater made by Noritake Company Ltd., for 10 seconds. Subsequently, also using a bar coater, pure water was applied to the film in an amount of 3 ml/m². Next, this was washed with water using a fountain coater, and then dewatered using an air knife, and this operation was repeated three times. Subsequently, the film was conveyed in a drying zone at 70 degrees Celsius for 10 seconds, and dried therein thereby giving an alkali-saponified cellulose acetate transparent support A.

Formulation of Alkali Solution (Part by Mass)

| | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

<Production of Transparent Support with Rubbed Alignment Film>

Using a wire bar #8, a rubbing alignment film coating liquid having the formulation mentioned below was continuously applied onto the saponified surface of the previously-produced support. This was dried with hot air at 60 degrees Celsius for 60 seconds and then with hot air at 100 degrees Celsius for 120 seconds, thereby forming an alignment film. Next, a stripe mask, in which the lateral stripe width of the transmitting part is 285 micro meters and the lateral stripe width of the blocking part is 285 micro meters, was set on the rubbing alignment film, and in air at room temperature, this was exposed to UV rays for 4 seconds, using an air-cooled metal halide lamp (by Eye Graphics), of which the lighting intensity in a UV-C region is 2.5 mW/cm², to thereby decompose the photo-acid-generating agent to generate an acid compound, thereby forming an alignment for first retardation domain. Subsequently, this was rubbed once back and force in one direction at 500 rpm, kept at an angle of 45° relative to the stripe of the stripe mask, thereby producing a transparent support with rubbed alignment film. The thickness of the alignment film was 0.5 micro meters.

Formulation for Alignment Film Forming Coating Liquid

| | |
|---|---|
| Polymer material for alignment film (PVA103, polyvinyl alcohol by Kuraray) | 3.9 parts by mass |
| Photo-acid-generating agent (S-2) | 0.1 parts by mass |
| Methanol | 36 parts by mass |
| Water | 60 parts by mass |

Photo-acid-generating agent S-2:

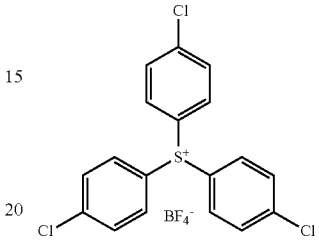

<Formation of Patterned Optically-Anisotropic Layer A>

Using a bar coater, the coating liquid for optically-anisotropic layer mentioned below was applied onto the support in a coating amount of 4 ml/m². Next, this was heated and ripened at a surface temperature of 110 degrees Celsius for 2 minutes, then cooled to 80 degrees Celsius, and using an air-cooled metal halide lamp of 20 mW/cm² (by Eye Graphics) in air, this was irradiated with UV rays for 20 seconds to fix the alignment state, thereby forming a patterned optically-anisotropic layer A. In the mask-exposed area (first retardation domain), the discotic liquid crystal was vertically aligned with the slow axis direction kept parallel to the rubbing direction, and in the non-exposed area (second retardation domain), the liquid crystal was aligned vertically with the slow axis direction kept perpendicular to the rubbing direction. The thickness of the optically-anisotropic layer was 0.9 micro meters.

Formulation of Coating Liquid for Optically-Anisotropic Layer

| | |
|---|---|
| Discotic liquid crystal E-1 | 100 parts by mass |
| Alignment film-side interface aligning agent (II-1) | 3.0 parts by mass |
| Air-side interface aligning agent (P-1) | 0.4 parts by mass |
| Photopolymerization initiator (Irgacure 907, by Ciba Specialty Chemicals) | 3.0 parts by mass |
| Sensitizer (Kayacure DETX, by Nippon Kayaku) | 1.0 parts by mass |
| Methyl ethyl ketone | 400 parts by mass |

Discotic Liquid Crystal E-1:

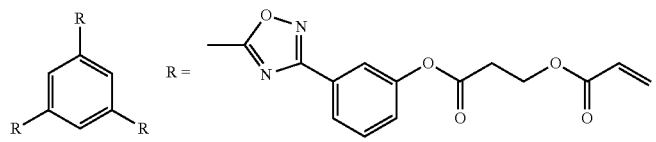

Alignment film-Side Interface Aligning Agent (II-1):

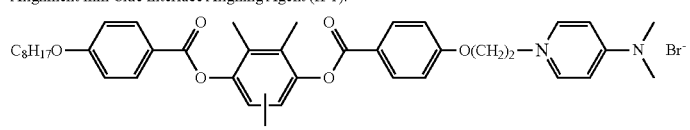

Air-Side Interface Aligning Agent (P-1):

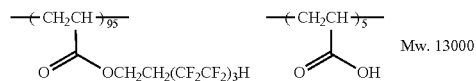

(Production of Polarizer)

A polyvinyl alcohol film having a thickness of 80 μm was dyed in an aqueous solution of 0.3% iodine, was stretched by 5% in an aqueous solution containing 4% boric acid and 2% potassium iodide, and dried at 50° C. for 4 min to prepare a polarizer.

(Production of Polarizing Plate)

Eighteen parts by mass of tris(6-isocyanatohexyl)isocyanurate was mixed with 2 parts by mass of polyethylene glycol methyl-etherified at one end (weight average molecular weight: 1000) and 0.2 parts by mass of di-n-butyl tin laurate. The mixture was applied to a reaction under a nitrogen atmosphere at 40° C. to prepare an isocyanate compound having a water dispersible component in the molecule. This compound was dispersed in 80 parts by mass of water to prepare an isocyanate adhesive agent (1).

A surface of a triacetylcellulose film was saponified, and the isocyanate adhesive agent (1) was applied to the saponified surface. The triacetylcellulose film was bonded to both surfaces of the polarizer using a roll laminator, followed by drying at 60° C. for 10 min and then hardening at 40° C. for 72 hr to prepare a polarizing plate.

(Preparation of Iodine Scavenger-Containing Adhesive Agent)

Eighteen parts by mass of tris(6-isocyanatohexyl) isocyanurate was mixed with 2 parts by mass of polyethylene glycol methyl-etherified at one end (weight average molecular weight: 1000) and 0.2 parts by mass of di-n-butyl tin laurate. The mixture was reacted under a nitrogen atmosphere at 40° C. to prepare an isocyanate compound having a water dispersible component in the molecule. To this compound, 0.1 parts by mass of a water-soluble starch (which is described in Example 1 of JP-A-2006-274100) was added. The resulting mixture was dispersed in 80 parts by mass of water to prepare iodine scavenger-containing adhesive agent (1).

(Production of Patterned Polarizing Plate)

A surface of a patterned optically-anisotropic layer, which is a cured layer (1), was subjected to corona discharge treatment. Subsequently, the patterned optically-anisotropic layer was applied with the iodine scavenger-containing isocyanate adhesive agent (1) on one surface and was bonded to the polarizing plate with a roll laminator, followed by drying at 60° C. for 10 min and then hardening at 40° C. for 72 hr to prepare a patterned polarizing plate (1) where the patterned optically-anisotropic layer and the polarizing plate were unified. The adhesive layer had a thickness of 0.1 μm.

Example 2

A patterned polarizing plate (2) was produced as in Example 1 except that an iodine scavenger-containing adhesive agent (2) containing 0.1 parts by mass of α-cyclodextrin in place of the starch in the iodine scavenger-containing adhesive agent (1) was used.

Example 3

A patterned polarizing plate (3) was produced as in Example 1 except that an iodine scavenger-containing adhesive agent (3) containing 0.1 parts by mass of β-cyclodextrin in place of the starch in the iodine scavenger-containing adhesive agent (1) was used.

Example 4

A patterned polarizing plate (4) was produced as in Example 1 except that an iodine scavenger-containing adhesive agent (4) containing 0.1 parts by mass of γ-cyclodextrin in place of the starch in the iodine scavenger-containing adhesive agent (1) was used.

Example 5

A patterned polarizing plate (5) was produced as in Example 1 except that an iodine scavenger-containing adhesive agent (5) containing 0.1 parts by mass of polyvinylpyridine (Mw: 18000) in place of the starch in the iodine scavenger-containing adhesive agent (1) was used.

Example 6

A patterned polarizing plate (6) was produced as in Example 1 except that an iodine scavenger-containing adhesive agent (6) containing 0.1 parts by mass of polyvinylpyrrolidone (Mw: 20000) in place of the starch in the iodine scavenger-containing adhesive agent (1) was used.

Example 7

A patterned polarizing plate (7) was produced as in Example 1 except that a cured layer (2) prepared as below was used in place of the cured layer (1).

Production of Cured Layer (2)

(Production of Photo-Alignment Film)

Figure 6:
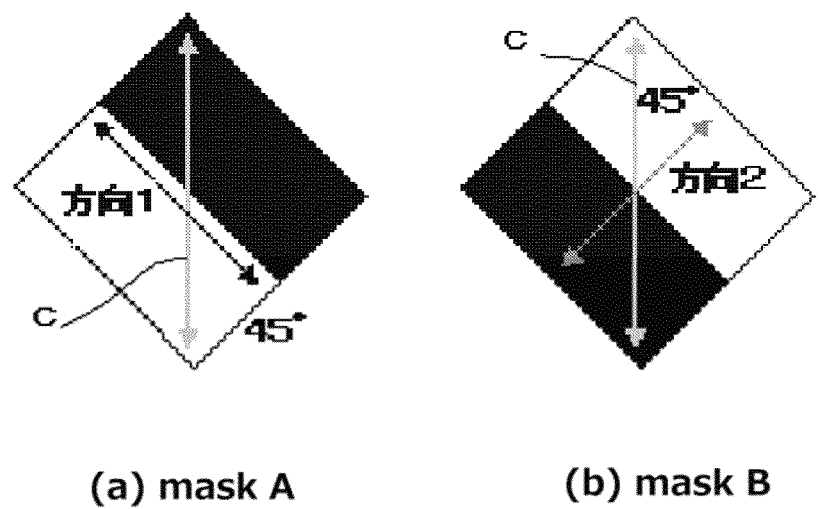
FIG. 6 includes schematic diagrams illustrating examples of the exposure mask used in Examples.

An aqueous solution of 1% photo-alignment material E-1 having a structure shown below is spin-coated onto a surface of a cellulose acetate transparent support A, followed by drying at 100° C. for 1 min. The resulting coated film was irradiated with ultraviolet light at 160 W/cm in air using an air-cooling metal halide lamp (manufactured by Eye Graphics Co., Ltd.). On this occasion, a wire-grid polarizer (manufactured by Moxtek, Inc., ProFlux PPL02) is set in the direction 1 as shown in FIG. 6(*a*) and is then exposed to light through a mask A (a quartz exposure mask having an image pattern). Subsequently, the wire-grid polarizer was set in the direction 2 as shown in FIG. 6(*b*) and is then exposed to light through a mask B. The distance between the exposure mask surface and the photo-alignment film was set to be 200 μm. The illumination intensity of the ultraviolet light used on this occasion was set to 100 mW/cm$^2$ in a UV-A region (integration in the wavelength range of 380 to 320 nm), and the dose was set to 1000 mJ/cm$^2$ in a UV-A region.

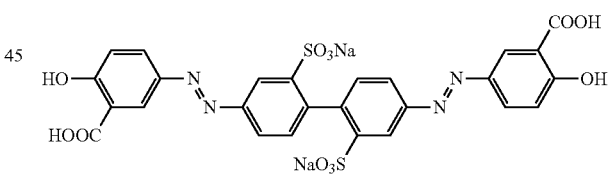

E-1

(Production of Optically-Anisotropic Layer)

A composition for optically-anisotropic layer shown below is prepared and filtered through a polypropylene filter having a pore size of 0.2 μm. This composition is used as a coating solution for an optically-anisotropic layer. The coating solution is applied into a film and dried at a film surface temperature of 105° C. for 2 min into a liquid crystal phase state. After being cooled to 75° C., the film is irradiated with ultraviolet light at 160 W/cm in air using an air-cooling metal halide lamp (manufactured by Eye Graphics Co., Ltd.) to immobilize the alignment state and thereby to form ¼ wavelength layers having a thickness of 1.3 μm and patterned in such a manner that each slow axis is an angle of ±45° with respect to the polarizing axis of a linear polarizing layer. The resulting sample has a tilt angle of about 1° and an Re of 138 nm at a measurement wavelength of 550 nm, and the total Rth of this layer and the transparent support is 13 nm.

(Composition for Optically-Anisotropic Layer)

| | |
|---|---|
| Rod-like liquid crystal I-27: | 100 parts by mass |
| Horizontal alignment agent A: | 0.3 parts by mass |
| Photopolymerization initiator (Irgacure 907, manufactured by Ciba Speciality Chemicals, Inc.) | 3.3 parts by mass |
| Sensitizer (Kayacure-DETX, manufactured by Nippon Kayaku Co., Ltd.): | 1.1 parts by mass |
| Methyl ethyl ketone: | 300 parts by mass |

Rod-like liquid crystal I-27

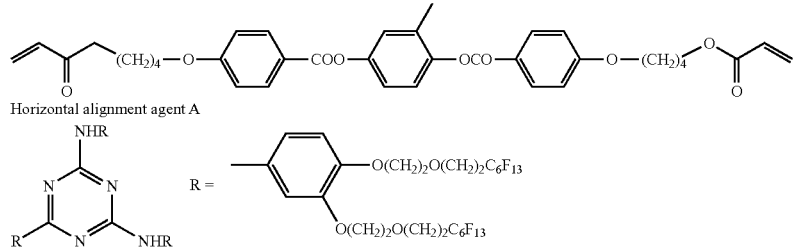

Horizontal alignment agent A

Comparative Example 1

A patterned polarizing plate (A) was produced as in Example 1 except that the isocyanate adhesive agent (1) was used in place of the iodine scavenger-containing adhesive agent (1).

Example 8

A patterned polarizing plate (8) was produced as in Example 1 except that the patterned optically-anisotropic layer was not subjected to corona discharge treatment.

Evaluation

Measurement of Water Resistance, Number of Blisters, and Damage of Patterned Polarizing Plate The polarizing plates prepared in Examples and Comparative Example were each cut into a rectangle (50 cm long and 25 cm wide) in such a manner that the stretching direction of the polarizer is the long-side direction. Each piece was immersed in warm water of 60° C. for 8 hr and was visually observed for peeling. Furthermore, the number of blisters was counted. Damages of the patterned polarizing plate were visually evaluated through observation of extinction under crossed nicols for evaluating polarizer durability according to the following criteria. The results are summarized in Table 1.

A: No recognition of light leakage (no light leakage in a rectangular of 50 cm long and 25 cm wide)

B: Light leakage at a level within the allowable range in practical use (light leakage at one to ten points in a rectangular of 50 cm long and 25 cm wide)

C: Light leakage at a level outside the allowable range in practical use (light leakage at more than ten points in a rectangular of 50 cm long and 25 cm wide)

Measurement of Adhesive Strength

The polarizing plates were each cut into a piece of 25×250 mm. The piece of polarizing plate was bonded (2 kg roll, one reciprocation) to a non-alkali glass plate (1737 manufactured by Corning Inc., size: 50×200 mm, thickness: 1.0 mm) and was subjected to autoclave treatment at a temperature of 50° C. and a pressure of 0.5 MPa for 30 min, followed by leaving to stand at 23° C. and 60% RH for 3 hour to prepare a test sample (a).

The adhesive strength of the test sample (a) was measured at a peel rate of 300 mm/min and a peel angle of 90° with a universal tensile tester. The measurement was performed under an environment of 23° C. and 50% RH.

In the results of testing, the adhesive strength is shown as that for 25 mm of a polarizing plate having a 25 μm thick adhesive layer.

TABLE 1

| | Retardation film | Water resistance | Number of blisters (blisters/cm$^2$) | Damage of patterned polarizing plate | Adhesive strength (N/25 mm) |
|---|---|---|---|---|---|
| Example 1 | Patterned retardation film (1) | Not peeled | 1.2 | A | 8 |
| Example 2 | Patterned retardation film (2) | Not peeled | 1.1 | A | 7 |
| Example 3 | Patterned retardation film (3) | Not peeled | 1.5 | A | 9 |
| Example 4 | Patterned retardation film (4) | Not peeled | 1.4 | A | 7 |
| Example 5 | Patterned retardation film (5) | Not peeled | 1.3 | A | 7 |
| Example 6 | Patterned retardation film (6) | Not peeled | 1.1 | A | 7 |
| Example 7 | Patterned retardation film (7) | Not peeled | 1.2 | A | 8 |
| Example 8 | Patterned retardation film (8) | Not peeled | 1.3 | B | 8 |
| Comparative Example 1 | Patterned retardation film (A) | Peeled | unmeasurable | unmeasurable | unmeasurable |

The results demonstrate that the patterned polarizing plates in Examples 1 to 8 where a cured layer and a polarizer are bonded with an iodine scavenger-containing adhesive agent have excellent water resistance and cause a small number of blisters. In addition, the patterned polarizing plates are not damaged, and the adhesive strength is excellent.

In contrast, in Comparative Example 1 where a cured layer and a polarizer are bonded with an adhesive agent not containing an iodine scavenger, all of the water resistance, the number of blisters, the damage of patterned polarizing plate, and the adhesive strength are inferior to those in Examples 1 to 8.

The present disclosure relates to the subject matter contained in Japanese Patent Application No. 188525/2011 filed on Aug. 31, 2011, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polarizing plate comprising:
   a polarizer;
   a cured layer of a curable composition; and
   at least one layer containing an iodine scavenger disposed between the polarizer and the cured layer,
   wherein the iodine scavenger is at least one selected from the group consisting of starches, cyclodextrins, and polyvinylpyridines.

2. The polarizing plate according to claim 1, wherein the layer containing the iodine scavenger is an adhesive layer.

3. The polarizing plate according to claim 1, wherein the layer containing the iodine scavenger is an adhesive layer bonding the cured layer and the polarizer to each other.

4. The polarizing plate according to claim 1, wherein the cured layer has an activated surface.

5. The polarizing plate according to claim 1, wherein the curable composition contains at least one liquid crystal compound.

6. The polarizing plate according to claim 1, wherein the polarizer is a polyvinyl alcohol film.

7. The polarizing plate according to claim 1, wherein the cured layer is an optically-anisotropic layer.

8. The polarizing plate according to claim 7, wherein the optically-anisotropic layer is a patterned opticallyanisotropic layer.

9. The polarizing plate according to claim 2, wherein the cured layer has an activated surface.

10. The polarizing plate according to claim 3, wherein the cured layer has an activated surface.

11. An image display apparatus comprising a polarizing plate according to claim 1.

12. The image display apparatus according to claim 11, being capable of displaying a 3D image.

* * * * *